United States Patent
Yamakaji et al.

(10) Patent No.: US 9,373,834 B2
(45) Date of Patent: Jun. 21, 2016

(54) METHOD FOR FORMING POSITIVE ELECTRODE FOR LITHIUM-ION SECONDARY BATTERY

(71) Applicant: SEMICONDUCTOR ENERGY LABORATORY CO., LTD., Atsugi-shi, Kanagawa-ken (JP)

(72) Inventors: Masaki Yamakaji, Kanagawa (JP); Rika Yatabe, Kanagawa (JP); Hiroatsu Todoriki, Nagano (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 0 days.

(21) Appl. No.: 13/710,497

(22) Filed: Dec. 11, 2012

(65) Prior Publication Data
US 2013/0156942 A1    Jun. 20, 2013

(30) Foreign Application Priority Data
Dec. 16, 2011    (JP) .................................. 2011-276235

(51) Int. Cl.
*B05D 5/12* (2006.01)
*H01M 4/04* (2006.01)
*H01M 4/139* (2010.01)
(Continued)

(52) U.S. Cl.
CPC ............ *H01M 4/0404* (2013.01); *H01M 4/139* (2013.01); *H01M 4/625* (2013.01); *H01M 4/1391* (2013.01); *H01M 4/1397* (2013.01); *H01M 4/623* (2013.01); *Y02E 60/122* (2013.01); *Y02P 70/54* (2015.11)

(58) Field of Classification Search
USPC .............................. 427/58, 122, 126.3, 126.6
See application file for complete search history.

(56) References Cited

U.S. PATENT DOCUMENTS

| 4,302,518 A | 11/1981 | Goodenough et al. |
| 4,668,595 A | 5/1987 | Yoshino et al. |

(Continued)

FOREIGN PATENT DOCUMENTS

| CN | 1964917 | 5/2007 |
| CN | 101094806 A | 12/2007 |

(Continued)

OTHER PUBLICATIONS

Merriam-Webster online dictionary, "Paste" definition.*

(Continued)

*Primary Examiner* — Austin Murata
(74) *Attorney, Agent, or Firm* — Nixon Peabody LLP; Jeffrey L. Costellia

(57) ABSTRACT

To provide a positive electrode for a lithium-ion secondary battery, which is highly filled with a positive electrode active material and has a high-density positive electrode active material layer. To provide a lithium-ion secondary battery having high capacity and improved cycle characteristics with use of the positive electrode. After graphene oxide is dispersed in a dispersion medium, a positive electrode active material is added and mixed to form a mixture. A binder is added to the mixture and mixed to form a positive electrode paste. The positive electrode paste is applied to a positive electrode current collector and the dispersion medium contained in the positive electrode paste is evaporated, and then, the graphene oxide is reduced, so that a positive electrode active material layer containing graphene is formed over the positive electrode current collector.

24 Claims, 14 Drawing Sheets

(51) Int. Cl.
*H01M 4/1391* (2010.01)
*H01M 4/1397* (2010.01)
*H01M 4/62* (2006.01)

(56) References Cited

U.S. PATENT DOCUMENTS

| | | | |
|---|---|---|---|
| 5,783,333 | A | 7/1998 | Mayer |
| 5,871,866 | A | 2/1999 | Barker et al. |
| 5,910,382 | A | 6/1999 | Goodenough et al. |
| 6,085,015 | A | 7/2000 | Armand et al. |
| 6,514,640 | B1 | 2/2003 | Armand et al. |
| 7,179,561 | B2 | 2/2007 | Niu et al. |
| 7,572,542 | B2 | 8/2009 | Naoi |
| 7,658,901 | B2 | 2/2010 | Prud'Homme et al. |
| 7,745,047 | B2 | 6/2010 | Zhamu et al. |
| 7,842,432 | B2 | 11/2010 | Niu et al. |
| 7,939,218 | B2 | 5/2011 | Niu |
| 7,977,007 | B2 | 7/2011 | Niu et al. |
| 7,977,013 | B2 | 7/2011 | Niu et al. |
| 8,278,011 | B2 | 10/2012 | Zhu et al. |
| 8,317,984 | B2 | 11/2012 | Gilje |
| 2001/0010807 | A1 | 8/2001 | Matsubara |
| 2002/0102459 | A1 | 8/2002 | Hosoya et al. |
| 2002/0195591 | A1 | 12/2002 | Ravet et al. |
| 2006/0051671 | A1 | 3/2006 | Thackeray et al. |
| 2007/0009799 | A1 | 1/2007 | Zheng |
| 2007/0131915 | A1 | 6/2007 | Stankovich et al. |
| 2008/0048153 | A1 | 2/2008 | Naoi |
| 2008/0254296 | A1 | 10/2008 | Handa et al. |
| 2009/0110627 | A1 | 4/2009 | Choi et al. |
| 2009/0117467 | A1 | 5/2009 | Zhamu et al. |
| 2009/0123850 | A1 | 5/2009 | Takeuchi et al. |
| 2009/0253045 | A1 | 10/2009 | Kotato et al. |
| 2009/0305135 | A1 | 12/2009 | Shi et al. |
| 2010/0035093 | A1* | 2/2010 | Ruoff et al. .................. 429/12 |
| 2010/0055025 | A1 | 3/2010 | Jang et al. |
| 2010/0081057 | A1 | 4/2010 | Liu et al. |
| 2010/0105834 | A1 | 4/2010 | Tour et al. |
| 2010/0143798 | A1 | 6/2010 | Zhamu et al. |
| 2010/0176337 | A1 | 7/2010 | Zhamu et al. |
| 2010/0233538 | A1 | 9/2010 | Nesper et al. |
| 2010/0233546 | A1 | 9/2010 | Nesper et al. |
| 2010/0248034 | A1 | 9/2010 | Oki et al. |
| 2010/0301279 | A1 | 12/2010 | Nesper et al. |
| 2010/0303706 | A1 | 12/2010 | Wallace et al. |
| 2010/0308277 | A1 | 12/2010 | Grupp et al. |
| 2010/0330421 | A1 | 12/2010 | Cui et al. |
| 2011/0012067 | A1 | 1/2011 | Kay |
| 2011/0111303 | A1 | 5/2011 | Kung et al. |
| 2011/0121240 | A1 | 5/2011 | Amine et al. |
| 2011/0136019 | A1 | 6/2011 | Amiruddin et al. |
| 2011/0159372 | A1 | 6/2011 | Zhamu et al. |
| 2011/0227000 | A1 | 9/2011 | Ruoff et al. |
| 2011/0229795 | A1 | 9/2011 | Niu et al. |
| 2012/0045692 | A1 | 2/2012 | Takemura et al. |
| 2012/0058397 | A1 | 3/2012 | Zhamu et al. |
| 2012/0064409 | A1* | 3/2012 | Zhamu et al. .................. 429/221 |
| 2012/0088151 | A1 | 4/2012 | Yamazaki et al. |
| 2012/0088156 | A1 | 4/2012 | Nomoto et al. |
| 2012/0100402 | A1 | 4/2012 | Nesper et al. |
| 2012/0308884 | A1 | 12/2012 | Oguni et al. |
| 2012/0308891 | A1 | 12/2012 | Todoriki et al. |
| 2012/0315550 | A1* | 12/2012 | Liu .................. C01B 25/45 429/338 |
| 2013/0017443 | A1 | 1/2013 | Yamazaki |
| 2013/0045418 | A1 | 2/2013 | Oguni et al. |
| 2013/0084384 | A1 | 4/2013 | Yamakaji |
| 2013/0266859 | A1 | 10/2013 | Todoriki et al. |
| 2013/0266869 | A1 | 10/2013 | Todoriki et al. |

FOREIGN PATENT DOCUMENTS

| | | |
|---|---|---|
| CN | 101174682 A | 5/2008 |
| CN | 101258628 | 9/2008 |
| CN | 101562248 A | 10/2009 |
| CN | 101710619 A | 5/2010 |
| CN | 101849302 | 9/2010 |
| CN | 101935036 | 1/2011 |
| CN | 102244264 A | 11/2011 |
| CN | 102456869 | 5/2012 |
| EP | 1 772 428 A1 | 4/2007 |
| EP | 2 256 087 A1 | 12/2010 |
| EP | 2 445 049 A1 | 4/2012 |
| JP | 06-060870 | 3/1994 |
| JP | H08-37007 A | 2/1996 |
| JP | 2002-110162 | 4/2002 |
| JP | 2003-238131 A | 8/2003 |
| JP | 2006-265751 | 10/2006 |
| JP | 2007-042620 | 2/2007 |
| JP | 2008-526664 | 7/2008 |
| JP | 2009-500806 | 1/2009 |
| JP | 2009-524567 | 7/2009 |
| JP | 2009-176721 | 8/2009 |
| JP | 2010-275186 | 12/2010 |
| JP | 2011-503804 | 1/2011 |
| JP | 2011-048992 | 3/2011 |
| JP | 2011-517053 | 5/2011 |
| JP | 2011-105569 | 6/2011 |
| JP | 4765077 | 9/2011 |
| JP | 2012-064571 | 3/2012 |
| JP | 2012-094516 | 5/2012 |
| JP | 2012-099467 | 5/2012 |
| JP | 2012-099468 | 5/2012 |
| JP | 2012-224526 | 11/2012 |
| KR | 2006-0077359 | 7/2006 |
| KR | 2007-0030274 | 3/2007 |
| KR | 2010-0088667 | 8/2010 |
| KR | 2010-0127729 | 12/2010 |
| KR | 2012-0047782 | 5/2012 |
| WO | WO-2005-121022 A1 | 12/2005 |
| WO | WO 2006/062947 A2 | 6/2006 |
| WO | WO-2006-071076 A1 | 7/2006 |
| WO | WO-2007/004728 | 1/2007 |
| WO | WO-2007-008422 A2 | 1/2007 |
| WO | WO 2007/061945 A2 | 5/2007 |
| WO | WO-2009-061685 A1 | 5/2009 |
| WO | WO 2009/127901 A2 | 10/2009 |
| WO | WO 2009/144600 A2 | 12/2009 |
| WO | WO-2011-057074 A2 | 5/2011 |
| WO | WO-2011-079238 A1 | 6/2011 |
| WO | WO2011/141486 | 11/2011 |
| WO | WO-2012-023464 A1 | 2/2012 |
| WO | WO-2012-046669 A1 | 4/2012 |
| WO | WO-2012-046791 A1 | 4/2012 |

OTHER PUBLICATIONS

Feng et al. (Strong reduced graphene oxide-polymer composite: hydrogels and wires) Jul. 6, 2012.*
Pei et al. (The reduction of graphene oxide) Aug. 2012.*
Paek.S et al., "Enhanced Cyclic Performance and Lithium Storage Capacity of $SnO_2$/Graphene Nanoporous Electrodes with Three-Dimensionally Delaminated Flexible Structure,", Nano Letters, 2009, vol. 9, No. 1, pp. 72-75.
Wang.G et al., "Sn/graphene nanocomposite with 3D architecture for enhanced reversible lithium storage in lithium ion batteries,", J. Mater. Chem. (Journal of Materials Chemistry), 2009, vol. 19, No. 44, pp. 8378-8384.
Wang.D et al., "Self-Assembled $TiO_2$-Graphene Hybrid Nanostructures for Enhanced Li-Ion Insertion,", ACS Nano, 2009, vol. 3, No. 4, pp. 907-914.
International Search Report (Application No. PCT/JP2012/063569; PCT15343/15459/15469) Dated Aug. 21, 2012.
Written Opinion (Application No. PCT/JP2012/063569; PCT15343/15459/15469) Dated Aug. 21, 2012.
Padhi et al., "Phospho-Olivines as Positive-Electrode Materials for Rechargeable Lithium Batteries", Journal of the Electrochemical Society, Apr. 1, 1997, vol. 144, No. 4, pp. 1188-1194.
Zhou.X et al., "Graphene modified LiFePO4 cathode materials for high power lithium ion batteries,", J. Mater. Chem. (Journal of Materials Chemistry), 2011, vol. 21, pp. 3353-3358.

(56) References Cited

OTHER PUBLICATIONS

Su.F et al., "Flexible and planar graphene conductive additives for lithium-ion batteries,", J. Mater. Chem. (Journal of Materials Chemistry), 2010, vol. 20, pp. 9644-9650.

Yu.G et al., "Solution-Processed Graphene/MnO2 Nanostructured Textiles for High-Performance Electrochemical Capacitors,", Nano Letters, 2011, vol. 11, No. 7, pp. 2905-2911.

Todoriki.H et al., "High performance lithium ion battery using Graphene Net electrode", *222nd ECS Meeting Abstract*, 2012, p. 1014.

Dreyer.D et al., "The chemistry of graphene oxide", *Chem. Soc. Rev.*, 2010, vol. 39, Issue 1, pp. 228-240.

R. Sundaram et al., "Electrochemical Modification of Graphene", Adv. Mater., 2008, vol. 20, Issue 16, pp. 3050-3053.

C. Mattevi et al., "Evolution of electrical, chemical, and structural properties of transparent and conducting chemically derived graphene thin films", Adv. Funct. Mater., 2009, vol. 19, Issue 16, pp. 2577-2583.

H. Zhang et al., "Vacuum-assisted synthesis of graphene from thermal exfoliation and reduction of graphite oxide", J. Mater Chem., 2011, vol. 21, Issue 14, pp. 5392-5397.

M. Zhou et al., "Controlled Synthesis of Large-Area and Patterned Electrochemically Reduced Graphene Oxide Films" Chem. Eur. J., 2009, vol. 15, Issue 25, pp. 6116-6120.

Z. Wang et al., "Direct Electrochemical Reduction of Single-Layer Graphene Oxide and Subsequent Functionalization with Glucose Oxidase", J. Phys. Chem. C, 2009, vol. 113, No. 32, pp. 14071-14075.

S. Park et al., "Hydrazine-reduction of graphite- and graphene oxide", Carbon, 2011, vol. 49, Issue 9, pp. 3019-3023.

Y. Shao et al., "Facile and controllable electrochemical reduction of graphene oxide and its applications", J. Mater. Chem., 2010, vol. 20, Issue 1, pp. 743-748.

Chan. C et al., "High-performance lithium battery anodes using silicon nanowires", Nature Nanotechnology, Dec. 16, 2007, vol. 3, pp. 31-35.

Y. Shao et al., "Facile and controllable electrochemical reduction of graphene oxide and its applications", J. Mater. Chem., 2010, vol. 20, Issue 4, pp. 743-748.

Chinese Office Action (Application No. 201210541712.5) Dated Dec. 24, 2015.

\* cited by examiner

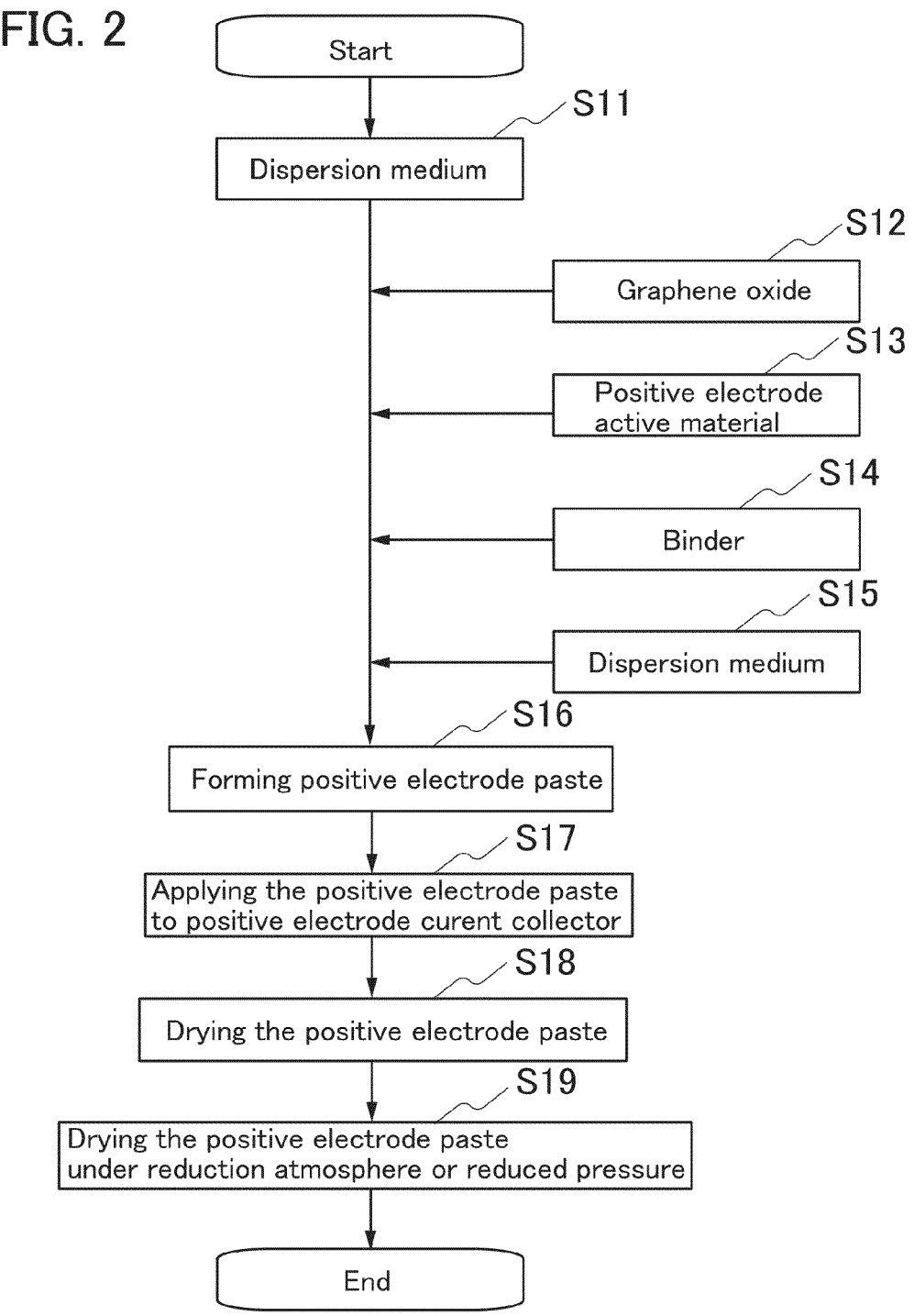

METHOD FOR FORMING POSITIVE ELECTRODE FOR LITHIUM-ION SECONDARY BATTERY

BACKGROUND OF THE INVENTION

1. Field of the Invention

The present invention relates to a positive electrode for a lithium-ion secondary battery and a method for forming the positive electrode.

2. Description of the Related Art

In recent years, portable electronic devices such as mobile phones and laptop personal computers have rapidly become common, and the demand for smaller size and higher capacity of batteries which are drive power sources thereof has been increased. As a battery used for a portable electronic device, a lithium-ion secondary battery which has advantages of high energy density and high capacity has been widely used.

A lithium-ion secondary battery includes a positive electrode containing an active material such as lithium cobaltate, a negative electrode formed of a carbon material capable of occluding/releasing lithium, such as graphite, and an electrolyte solution in which an electrolyte containing a lithium salt such as $LiBF_4$ or $LiPF_6$ is dissolved in an organic solvent such as ethylene carbonate or diethyl carbonate. Such a battery is charged and discharged by movement of lithium ions between a positive electrode and a negative electrode.

Further, a binder is used in order that active materials or an active material and a current collector are bound to each other. A binder is a polymer organic compound and has significantly poor conductivity. Therefore, when a large amount of a binder is used as compared with an active material, the proportion of the active material in the electrode is decreased; thus, capacity is decreased. In view of the above, a conductive additive such as acetylene black is mixed in order to improve conductivity (see Patent Document 1). In the case of using an active material with low conductivity, its conductivity is increased by microparticulation and carbon coating in some cases.

REFERENCE

Patent Document

[Patent Document 1] Japanese Published Patent Application No. 2002-110162

SUMMARY OF THE INVENTION

However, acetylene black used as a conductive additive has an average particle size of several tens of nanometers to several hundreds of nanometers and is a high volume particle; thus, contact with an active material easily becomes point contact. Point contact causes an increase in contact resistance, so that capacity of a battery is decreased. Further, when the proportion of the conductive additive is increased in order to increase contact points, the proportion of the active material in an electrode is decreased.

Further, the active material is difficult to mix with a binder or a conductive additive uniformly because cohesion of particles is increased as the active material has a smaller particle diameter. Therefore, a portion where active material particles are concentrated (portion where the active material particles are aggregated) and a portion where active material particles are thinly distributed are generated, so that an active material which cannot contribute to capacity is generated in a portion where a conductive additive does not exist.

In view of the above problems, an object of one embodiment of the present invention is to provide a positive electrode for a lithium-ion secondary battery, which is highly filled with a positive electrode active material and has a high-density positive electrode active material layer. Further, another object of one embodiment of the present invention is to provide a lithium-ion secondary battery which has high capacity and improved cycle characteristics with use of the positive electrode.

A positive electrode for a lithium-ion secondary battery according to one embodiment of the present invention includes graphene as a conductive additive contained in a positive electrode active material layer.

Graphene includes single-layer graphene and multilayer graphene including 2 to 100 layers. Single-layer graphene refers to a one-atom-thick sheet of carbon molecules having $sp^2$ bonds.

Graphenes are overlapped with each other in a positive electrode active material layer and dispersed so as to be in contact with a plurality of positive electrode active material particles. Alternatively, it can be said that a network of graphene is formed in a positive electrode active material layer. Thus, bonds of the plurality of positive electrode active material particles can be maintained.

Graphene is a sheet with a side of several micrometers. Therefore, when contact between a positive electrode active material and graphene is surface contact, contact resistance between the positive electrode active material and the graphene can be reduced. Contact between conductive additives (graphenes) is also surface contact, resulting in a reduction in contact resistance. The proportion of a positive electrode active material can be increased because it is not necessary that the proportion of a conductive additive is increased in order to increase contact points. Thus, contact resistance in the positive electrode active material layer is reduced and the proportion of the conductive additive is decreased, resulting in an increase in the proportion of the positive electrode active material in the electrode. As a result, battery capacity can be increased.

A positive electrode for a lithium-ion secondary battery according to one embodiment of the present invention is formed by the following method.

A positive electrode for a lithium-ion secondary battery according to one embodiment of the present invention is formed in the following manner: graphene oxide is dispersed in a dispersion medium and a positive electrode active material is added and mixed to form a mixture; a binder is added to the mixture and mixed to form a positive electrode paste; the positive electrode paste is applied to a positive electrode current collector and the dispersion medium contained in the positive electrode paste is evaporated; and the graphene oxide is reduced, so that a positive electrode active material layer including graphene is formed over the positive electrode current collector.

In the above forming method, the graphene oxide contained in the positive electrode paste is reduced under a reduction atmosphere. Thus, the dispersion medium remaining in the positive electrode paste can be evaporated and the graphene oxide contained in the positive electrode paste can be reduced. Alternatively, the positive electrode paste may be reduced under reduced pressure in the above forming method. This also enables the dispersion medium contained in the positive electrode paste to be evaporated and the graphene oxide contained in the positive electrode paste can be reduced.

When the binder is added to the mixture and mixed in the above forming method, a dispersion medium may be further added, which enables adjustment of the viscosity of the positive electrode paste.

Graphene oxide has an epoxy group, a carbonyl group, a carboxyl group, a hydroxyl group, or the like. Since oxygen contained in a functional group is negatively charged in a solution having polarity, different graphene oxides are not easily aggregated. Thus, the graphene oxide is uniformly dispersed in the solution having polarity. The positive electrode active material is added to the dispersion medium where the graphene oxide is dispersed, and mixing is performed, whereby aggregation of the graphene oxide and the positive electrode active material can be easily reduced; thus, the graphene oxide and the positive electrode active material can be uniformly mixed. The graphene oxide may be contained at least at 2 wt % with respect to the positive electrode paste (the total weight of the positive electrode active material, the conductive additive, and the binder).

Specifically, it is preferable that the graphene oxide be added at greater than or equal to 2 wt % and less than or equal to 3 wt %, the positive electrode active material be added at greater than or equal to 93 wt % and less than or equal to 96 wt %, and the binder be added at greater than or equal to 1 wt % and less than or equal to 5 wt %, with respect to the total weight of the positive electrode active material, the binder, and the graphene oxide.

The binder is preferably added to the mixture of the graphene oxide and the positive electrode active material because the positive electrode active material and the graphene oxide can be bound to each other so as to maintain a state where the graphene oxide is uniformly mixed in the positive electrode active material.

Oxygen is released from the graphene oxide by drying the positive electrode paste under a reduction atmosphere or reduced pressure, whereby the positive electrode active material layer containing graphene can be formed. Through the above steps, the positive electrode can be formed. Note that oxygen in the graphene oxide is not necessarily entirely released and may partly remain in the graphene.

When the graphene includes oxygen, the proportion of oxygen is higher than or equal to 2% and lower than or equal to 11%, preferably higher than or equal to 3% and lower than or equal to 10%. As the proportion of oxygen is lower, the conductivity of the graphene can be increased. As the proportion of oxygen becomes higher, more openings serving as paths of ions can be formed in the graphene.

A lithium-ion secondary battery can be formed using the positive electrode formed in the above-described manner, a negative electrode, an electrolyte solution, and a separator.

When a positive electrode for a lithium-ion secondary battery according to one embodiment of the present invention includes graphene as a conductive additive, the proportion of the conductive additive can be decreased as compared with the conventional case, which enables an increase in the amount of the positive electrode active material filling the electrode and an increase in density of the positive electrode active material layer. With the positive electrode, a lithium-ion secondary battery with high capacity and improved cycle characteristics can be formed.

According to one embodiment of the present invention, a positive electrode for a lithium-ion secondary battery, which is highly filled with a positive electrode active material and has a high-density positive electrode active material layer, can be provided. With the positive electrode, a lithium-ion secondary battery with high capacity per electrode volume and improved cycle characteristics can be provided.

BRIEF DESCRIPTION OF THE DRAWINGS

In the accompanying drawings:

FIG. 2 is a flowchart illustrating a method for forming a positive electrode;

DETAILED DESCRIPTION OF THE INVENTION

Figure 1A:
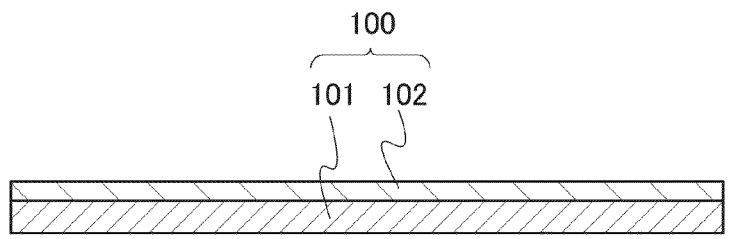
FIGS. 1A to 1C are cross-sectional views of a positive electrode.

Hereinafter, embodiments of the present invention will be described with reference to drawings. Note that the invention is not limited to the following description and it will be readily appreciated by those skilled in the art that modes and details thereof can be modified in various ways without departing from the spirit and the scope of the invention disclosed in this specification and the like. Structures of different embodiments can be implemented in an appropriate combination. Note that in the structures of the present invention described below, the same portions or portions having a similar function are denoted by the same reference numerals, and the repeated description thereof is omitted.

Note that the position, size, range, or the like of each structure illustrated in the drawings and the like is not accurately represented in some cases for easy understanding. Therefore, the disclosed invention is not necessarily limited to the position, size, range, or the like as disclosed in the drawings and the like.

In addition, in this specification, ordinal numbers such as "first", "second", and "third" are used in order to avoid confusion among components, and the terms do not mean limitation of the number of components.

Embodiment 1

Figure 1B:
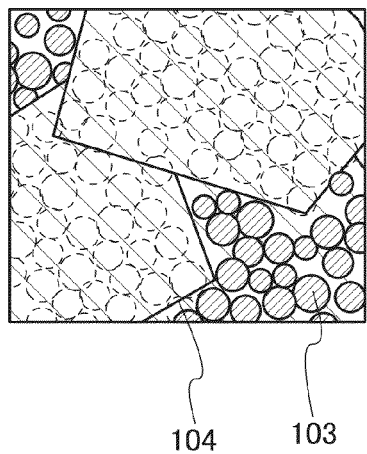
Figure 1C:
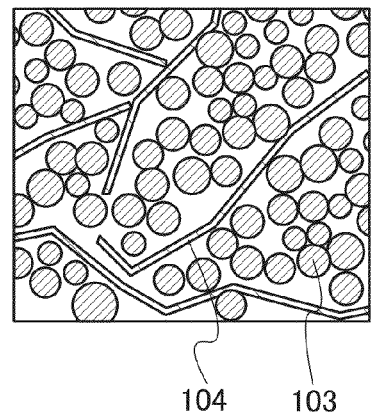

In this embodiment, a positive electrode for a lithium-ion secondary battery according to one embodiment of the present invention and a forming method thereof will be described with reference to FIGS. 1A to 1C and FIG. 2. FIGS. 1A to 1C are cross-sectional views of the positive electrode, and FIG. 2 is a flowchart illustrating the method for forming the positive electrode.

FIG. 1A is the cross-sectional view of a positive electrode 100. The positive electrode 100 is formed in such a manner that a positive electrode paste is applied to a positive electrode current collector 101 and dried under a reduction atmosphere or reduced pressure to form a positive electrode active material layer 102.

The positive electrode current collector 101 can be formed using a highly conductive material, for example, a metal such as stainless steel, gold, platinum, zinc, iron, aluminum, or titanium, or an alloy thereof. Note that the positive electrode current collector 101 can be formed using an aluminum alloy to which an element which improves heat resistance, such as silicon, titanium, neodymium, scandium, or molybdenum, is added. Alternatively, the positive electrode current collector 101 may be formed using a metal element which forms silicide by reacting with silicon. Examples of the metal element which forms silicide by reacting with silicon include zirconium, titanium, hafnium, vanadium, niobium, tantalum, chromium, molybdenum, tungsten, cobalt, nickel, and the like. The positive electrode current collector 101 can have a foil-like shape, a plate-like shape (a sheet-like shape), a net-like shape, a punching-metal shape, an expanded-metal shape, or the like as appropriate. The positive electrode current collector 101 preferably has a thickness of greater than or equal to 10 μm and less than or equal to 30

As a material of a positive electrode active material contained in the positive electrode active material layer 102, a compound such as $LiFeO_2$, $LiCoO_2$, $LiNiO_2$, $LiMn_2O_4$, $V_2O_5$, $Cr_2O_5$, or $MnO_2$ can be used.

Alternatively, a lithium-containing composite oxide having an olivine structure (a general formula $LiMPO_4$ (M is one or more of Fe(II), Mn(II), Co(II), and Ni(II))) may be used. Typical examples of the general formula $LiMPO_4$ which can be used as a material are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

Alternatively, a lithium-containing composite oxide such as a general formula $Li_{(2-j)}MSiO_4$ (M is one or more of Fe(II), Mn(II), Co(II), and Ni(II); 0≤j≤2) may be used. Typical examples of the general formula $Li_{(2-j)}MSiO_4$ which can be used as a material are lithium compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_aNi_bSiO_4$, $Li_{(2-j)}Fe_aCo_bSiO_4$, $Li_{(2-j)}Fe_aMn_bSiO_4$, $Li_{(2-j)}Ni_kCo/SiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

In the case where carrier ions are alkali metal ions other than lithium ions, alkaline-earth metal ions, beryllium ions, or magnesium ions, the positive electrode active material may contain, instead of lithium in the lithium compound and the lithium-containing composite oxide, an alkali metal (e.g., sodium or potassium), an alkaline-earth metal (e.g., calcium, strontium, or barium), beryllium, or magnesium.

Graphene is used as a conductive additive contained in the positive electrode active material layer 102. Reduction treatment is performed on graphene oxide, whereby graphene is formed.

Graphene oxide can be formed by an oxidation method called a Hummers method. The Hummers method is as follows: a sulfuric acid solution of potassium permanganate, a hydrogen peroxide solution, or the like is mixed into single crystal graphite powder to cause oxidation reaction; thus, a dispersion liquid containing graphite oxide is formed. Graphite oxide contains a functional group such as an epoxy group, a carbonyl group, a carboxyl group, or a hydroxyl group due to oxidation of carbon in graphite. Accordingly, the interlayer distance between adjacent graphenes of a plurality of graphenes in graphite oxide is longer than the interlayer distance of graphite. Then, ultrasonic vibration is applied to the mixed solution containing graphite oxide, so that the graphite oxide whose interlayer distance is long can be cleaved to separate graphene oxide and to form a dispersion liquid containing graphene oxide. Note that a method for forming graphene oxide other than the Hummers method can be used as appropriate. The solvent is removed from the dispersion liquid containing graphene oxide, so that graphene oxide can be obtained.

Graphene oxide includes an epoxy group, a carbonyl group, a carboxyl group, a hydroxyl group, or the like. In a solution having polarity, different graphene oxides are not easily aggregated because oxygen contained in the functional group is negatively charged. Accordingly, in a liquid having polarity, graphene oxides are dispersed uniformly.

The length of one side (also referred to as a flake size) of graphene oxide which is used is preferably several micrometers to several tens of micrometers.

Note that a solution in which commercial graphene oxide is dispersed in a solvent or a commercial graphene oxide dispersion liquid may be used for graphene oxide.

As a binder contained in the positive electrode active material layer 102, polyvinylidene fluoride (PVDF) or the like is used.

Next, a method for forming the positive electrode 100 containing a positive electrode active material layer will be described with reference to FIG. 2. The positive electrode 100 is formed in the following manner: a positive electrode paste is formed using the above-described positive electrode active material, conductive additive, binder, dispersion medium, applied to the positive electrode current collector 101, and then dried under a reduction atmosphere or reduced pressure.

First, NMP is prepared as the dispersion medium (Step S11), and graphene oxide is dispersed in the NMP (Step S12). When the amount of graphene oxide is less than 0.1 wt % with respect to the positive electrode paste, the conductivity is decreased in formation of the positive electrode active material layer 102. When the amount of graphene oxide is greater than 5 wt %, although it depends on the particle diameter of the positive electrode active material, the viscosity of the positive electrode paste is increased. In a drying step after the positive electrode paste is applied to the positive electrode current collector 101, convection is generated in the positive electrode paste by heating and thin and lightweight graphene oxide moves and is aggregated, whereby a crack might be formed in the positive electrode active material layer 102 or the positive electrode active material layer 102 might be separated from the positive electrode current collector 101. Thus, the amount of graphene oxide is set to 0.1 wt % to 5 wt %, preferably 2 wt % to 3 wt % with respect to the positive electrode paste (the total weight of the positive electrode active material, the conductive additive, and the binder).

Next, lithium iron phosphate is added as the positive electrode active material (Step S13). It is preferable to use lithium iron phosphate with an average particle size of greater than or equal to 100 nm and less than or equal to 500 nm. The amount of added lithium iron phosphate is greater than or equal to 90 wt %, preferably greater than or equal to 95 wt % with respect to the positive electrode paste; for example, the amount may be greater than or equal to 93 wt % and less than or equal to 96 wt %.

Next, this mixture is mixed in a state where the amount of the solvent is small to the mixture (this mixture is mixed at high viscosity), whereby aggregation of the graphene oxide and the lithium iron phosphate can be reduced. Since graphene oxide has a functional group, oxygen in the functional group is negatively charged in a polar solvent; thus, different graphene oxides are not easily aggregated. Further, graphene oxide strongly interacts with lithium iron phosphate. Thus, the graphene oxide can be uniformly dispersed into the lithium iron phosphate.

Next, PVDF is added to this mixture as the binder (Step S14). The amount of PVDF may be determined based on the amounts of graphene oxide and lithium iron phosphate, and PVDF may be added to the positive electrode paste at greater than or equal to 1 wt % and less than or equal to 10 wt %. The binder is added while the graphene oxide is uniformly dispersed so as to be in contact with a plurality of positive electrode active material particles, so that the positive electrode active material and the graphene oxide can be bound to each other while maintaining the dispersed state. The binder is not necessarily added depending on the proportions of the lithium iron phosphate and the graphene oxide; however, the binder is preferably added because the strength of the positive electrode can be increased.

Next, NMP is added to this mixture until predetermined viscosity is obtained (Step S15) and mixed, whereby the positive electrode paste can be formed (Step S16). Through the above steps, a positive electrode paste in which graphene oxide, a positive electrode active material, and a binder are uniformly mixed can be formed.

Next, the positive electrode paste is applied to the positive electrode current collector 101 (Step S17).

Next, the positive electrode paste applied to the positive electrode current collector 101 is dried (Step S18). The drying step is performed by heating at 60° C. to 170° C. for 1 minute to 10 hours to evaporate NMP. There is no particular limitation on the atmosphere.

Next, the positive electrode paste is dried under a reduction atmosphere or reduced pressure (Step S19). By heating at a temperature of 130° C. to 200° C. for 10 hours to 30 hours under a reduction atmosphere or reduced pressure, NMP and water which are left in the positive electrode paste are evaporated and oxygen contained in the graphene oxide is desorbed. Thus, the graphene oxide can be processed into graphene. Note that it is possible that oxygen in the graphene oxide is not entirely released and partly remains in the graphene.

Through the above steps, a positive electrode for a lithium-ion secondary battery including the positive electrode active material layer 102 where graphene is uniformly dispersed in a positive electrode active material can be formed. Note that a step of applying pressure to the positive electrode may be performed after the drying step.

FIG. 1B and FIG. 1C are cross-sectional schematic views of the positive electrode active material layer 102 formed by the above-described method.

FIG. 1B shows a state where graphene 104 covers a plurality of positive electrode active materials 103. The graphene 104 is a sheet of carbon molecules; therefore, the graphene 104 can be dispersed so as to be in contact with the plurality of positive electrode active materials 103 as illustrated in FIG. 1B. When the contact between the positive electrode active material 103 and the graphene 104 is a surface contact, contact resistance between the positive electrode active material 103 and the graphene 104 can be reduced. In addition, the contact between the graphene 104 and the graphene 104 is also a surface contact as illustrated in FIG. 1B; therefore, contact resistance between the graphene 104 and the graphene 104 can be reduced. The proportion of the positive electrode active material 103 can be increased because the proportion of the conductive additive is not necessarily increased in order to increase contact points between the positive electrode active material 103 and the graphene 104. Thus, capacity of a battery can be increased.

FIG. 1C is a schematic cross-sectional view different from that of FIG. 1B. The graphene 104 is observed to have a linear shape in cross section. In the positive electrode active material layer 102, a plurality of graphenes 104 is overlapped with each other and dispersed so as to be in contact with a plurality of positive electrode active materials 103. Alternatively, it can be said that a network of the graphenes 104 is formed in the positive electrode active material layer 102. Thus, bonds of the positive electrode active materials 103 are maintained.

As described in this embodiment, order of adding a positive electrode active material, graphene oxide, and a binder is important in forming a positive electrode paste. For example, in the case of using lithium iron phosphate as the positive electrode active material, when graphene oxide is added to a mixture of the lithium iron phosphate and a binder, there are concerns that contact area of the lithium iron phosphate and the graphene oxide is reduced and the graphene oxide is not uniformly dispersed. When a positive electrode formed using such a positive electrode paste is used in a secondary battery, capacity is decreased or a plateau potential is decreased, for example. Further, in the case where lithium iron phosphate, graphene oxide, and a binder are mixed at the same time to form a positive electrode paste, if the lithium iron phosphate and the binder are in contact with each other, the contact between the lithium iron phosphate and the graphene oxide might be hindered.

As described in this embodiment, a positive electrode active material is added to and mixed with a dispersion medium in which graphene oxide is dispersed, so that the graphene oxide can be uniformly dispersed in the positive electrode active material. When a binder is added in a state where the graphene oxide is dispersed so as to be in contact with a plurality of positive electrode active material particles, the binder can be uniformly dispersed without hindering the contact between the graphene oxide and the plurality of positive electrode active material particles. With use of a positive electrode paste formed in such a manner, a positive electrode which is highly filled with the positive electrode active material and has a high-density positive electrode active material layer can be formed. Further, when a battery is formed using the positive electrode, a lithium-ion secondary battery having high capacity and a high plateau potential can be formed. Since a state where sheet-like graphene is in contact with the plurality of positive electrode active materials by the binder can be maintained, separation between the positive electrode active material and the graphene can be suppressed. As a result, a lithium-ion secondary battery with improved cycle characteristics can be formed.

This embodiment can be combined with any of the other embodiments as appropriate.

Embodiment 2

In this embodiment, a structure of a lithium-ion secondary battery and a manufacturing method thereof will be described with reference to FIGS. 3A and 3B and FIGS. 4A and 4B.

Figure 3A:
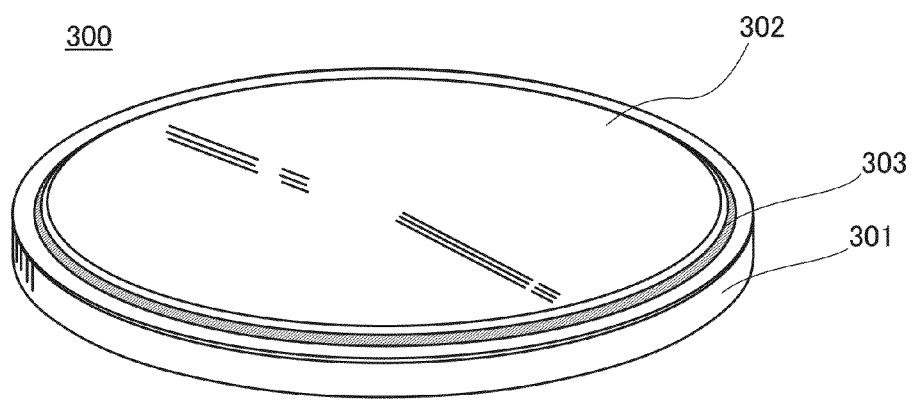
FIGS. 3A and 3B illustrate an example of a lithium-ion secondary battery.
Figure 3B:
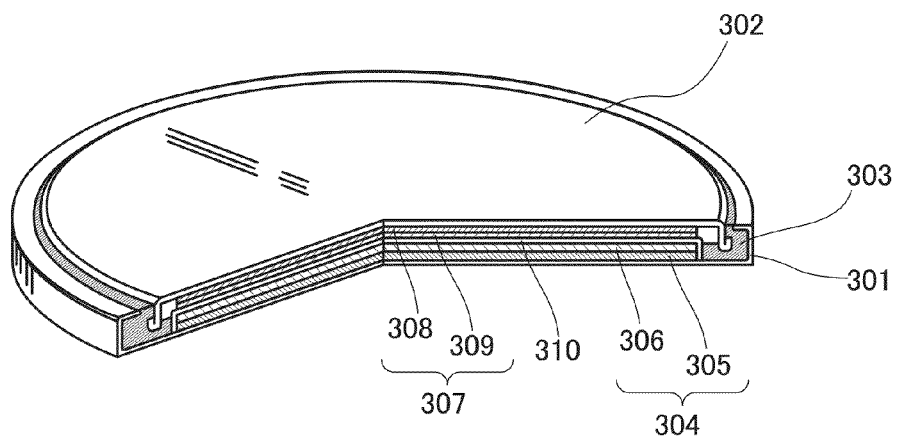

FIG. 3A is an external view of a coin-type (single-layer flat type) lithium-ion secondary battery, and FIG. 3B is a cross-sectional view thereof.

In a coin-type secondary battery 300, a positive electrode can 301 serving also as a positive electrode terminal and a negative electrode can 302 serving also as a negative electrode terminal are insulated and sealed with a gasket 303 formed of polypropylene or the like. A positive electrode 304 is formed of a positive electrode current collector 305 and a positive electrode active material layer 306 which is provided to be in contact with the positive electrode current collector 305. On the other hand, a negative electrode 307 is formed of a negative electrode current collector 308 and a negative electrode active material layer 309 which is provided to be in contact with the negative electrode current collector 308. A separator 310 and an electrolyte (not illustrated) are included between the positive electrode active material layer 306 and the negative electrode active material layer 309.

As the positive electrode 304, the positive electrode 100 described in Embodiment 1 can be used.

The negative electrode 307 can be formed in such a manner that the negative electrode active material layer 309 is formed over the negative electrode current collector 308 by a CVD method, a sputtering method, or a coating method.

For the negative electrode current collector 308, it is possible to use a highly conductive material, for example, a metal such as copper, nickel, or titanium, an aluminum-nickel alloy, or an aluminum-copper alloy. The negative electrode current collector 308 can have a foil-like shape, a plate-like shape (a sheet-like shape), a net-like shape, a punching-metal shape, an expanded-metal shape, or the like as appropriate. The negative electrode current collector 308 preferably has a thickness of greater than or equal to 10 µm and less than or equal to 30 µm.

There is no particular limitation on the material for the negative electrode active material as long as it is a material with which metal can be dissolved/precipitated or a material into/from which metal ions can be inserted/released. For the negative electrode active material, a lithium metal, a carbon-based material, silicon, a silicon alloy, or tin can be used, for example. As the carbon-based material into/from which a lithium ion can be inserted/released, a graphite powder or a graphite fiber can be used, for example. The negative electrode active material layer 309 may be formed by a coating method in the following manner: a conductive additive or a binder is added to the negative electrode active material to form a negative electrode paste; and the negative electrode paste is applied to the negative electrode current collector 308 and dried.

In the case where the negative electrode active material layer 309 is formed using silicon as the negative electrode active material, graphene is preferably formed on a surface of the negative electrode active material layer 309. The volume of silicon is greatly changed due to occlusion/release of carrier ions in charge/discharge cycles, adhesion between the negative electrode current collector 308 and the negative electrode active material layer 309 is decreased, resulting in degradation of battery characteristics caused by charge and discharge. In view of this, graphene is preferably formed on a surface of the negative electrode active material layer 309 containing silicon because even when the volume of silicon is changed in charge/discharge cycles, decrease in adhesion between the negative electrode current collector 308 and the negative electrode active material layer 309 can be suppressed and degradation of battery characteristics is reduced.

Graphene formed on the surface of the negative electrode active material layer 309 can be formed by reducing graphene oxide in a similar manner to that of the method for forming the positive electrode. As the graphene oxide, the graphene oxide described in Embodiment 1 can be used.

A method for forming graphene oxide on the negative electrode active material layer 309 by an electrophoresis method will be described with reference to FIG. 4A.

Figure 4A:
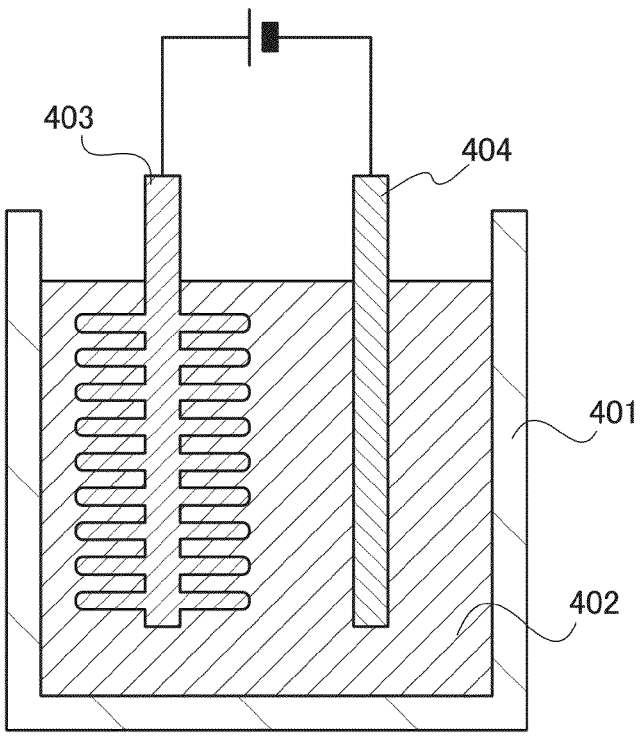
FIGS. 4A and 4B illustrate a method for forming a negative electrode.

FIG. 4A is a cross-sectional view illustrating an electrophoresis method. In a container 401, the dispersion liquid in which graphene oxide is dispersed and which is described in Embodiment 1 (hereinafter referred to as a graphene oxide dispersion liquid 402) is contained. Further, a formation subject 403 is put in the graphene oxide dispersion liquid 402 and is used as an anode. In addition, a conductor 404 serving as a cathode is put in the graphene oxide dispersion liquid 402. Note that the formation subject 403 is the negative electrode current collector 308 and the negative electrode active material layer 309 which is formed thereon. Further, the conductor 404 may be formed using a conductive material, for example, a metal material or an alloy material.

By applying appropriate voltage between the anode and the cathode, a graphene oxide layer is formed on a surface of the formation subject 403, that is, the surface of the negative electrode active material layer 309. This is because the graphene oxide is negatively charged in the polar solvent as described above, so that by applying voltage, the graphene oxide which is negatively charged is drawn to the anode and deposited on the formation subject 403. Negative charge of the graphene oxide is derived from release of hydrogen ions from a substituent such as a hydroxyl group or a carboxyl group included in the graphene oxide, and the substituent is bonded to an object to result in neutralization. Note that the voltage which is applied is not necessarily constant. Further, by measuring the amount of charge flowing between the anode and the cathode, the thickness of the graphene oxide layer deposited on the object can be estimated.

The voltage is applied between the cathode and the anode in the range of 0.5 V to 2.0 V, preferably 0.8 V to 1.5 V. For example, when the voltage applied between the cathode and the anode is set to 1 V, an oxide film which might be generated based on the principle of anodic oxidation is not easily formed between the formation subject and the graphene oxide layer.

When the graphene oxide with a required thickness is obtained, the formation subject 403 is taken out of the graphene oxide dispersion liquid 402 and dried.

In electrodeposition of graphene oxide by an electrophoresis method, a portion which is already covered with graphene oxide is scarcely stacked with additional graphene oxide. This is because the conductivity of graphene oxide is sufficiently low. On the other hand, a portion which is not covered yet with graphene oxide is preferentially stacked with graphene oxide. Therefore, the thickness of the graphene oxide formed on the surface of the formation subject 403 is substantially uniform.

Time for performing electrophoresis (time for applying voltage) is preferably longer than time for covering the surface of the formation subject 403 with the graphene oxide, for example, longer than or equal to 0.5 minutes and shorter than or equal to 30 minutes, more preferably longer than or equal to 5 minutes and shorter than or equal to 20 minutes.

With the use of an electrophoresis method, ionized graphene oxide can be electrically transferred to the active material, whereby graphene oxide can be provided uniformly even when the surface of the negative electrode active material layer 309 is uneven.

Next, part of oxygen is released from the formed graphene oxide by reduction treatment. Although, as the reduction treatment, reduction treatment by heating or the like, which is described in Embodiment 1 using graphene, may be performed, electrochemical reduction treatment (hereinafter, referred to as electrochemical reduction) will be described below.

Figure 4B:
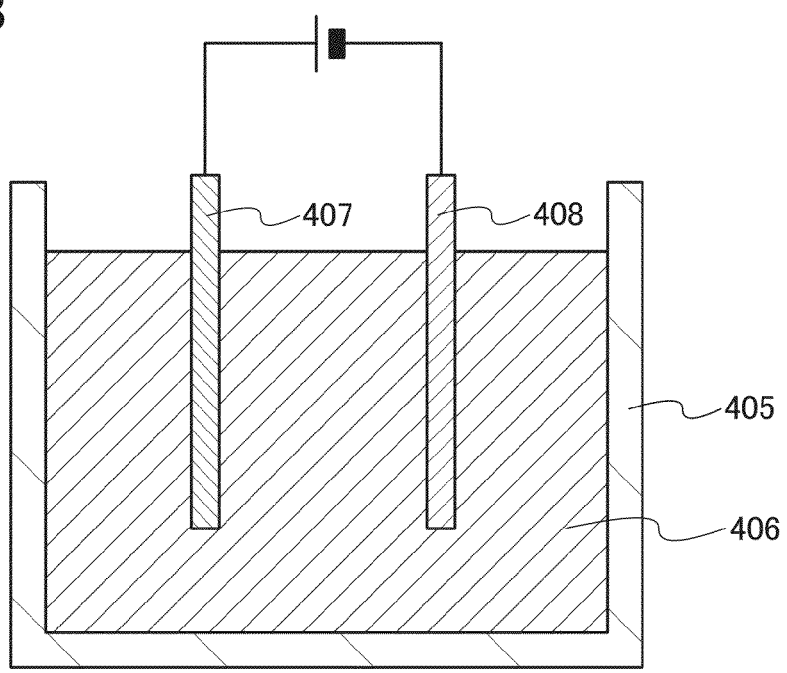

The electrochemical reduction of graphene oxide is reduction utilizing electric energy, which is different from reduction by heat treatment. As illustrated in FIG. 4B, a closed circuit is configured using, as a conductor 407, the cathode including graphene oxide provided over the negative electrode active material layer 309, and a potential at which the reduction reaction of the graphene oxide occurs or a potential at which the graphene oxide is reduced is supplied to the conductor 407, so that the graphene oxide is reduced to form graphene. Note that in this specification, a potential at which the reduction reaction of the graphene oxide occurs or a potential at which the graphene oxide is reduced is referred to as the reduction potential.

A method for reducing the graphene oxide will be specifically described with reference to FIG. 4B. A container 405 is filled with an electrolyte solution 406, and the conductor 407 provided with the graphene oxide and a counter electrode 408 are put in the container 405 so as to be immersed in the electrolyte solution 406. Next, an electrochemical cell (open circuit) is configured using at least the counter electrode 408 and the electrolyte solution 406 besides the conductor 407 provided with the graphene oxide, which serves as a working electrode, and the reduction potential of the graphene oxide is supplied to the conductor 407 (working electrode), so that the graphene oxide is reduced to form graphene. Note that the reduction potential to be supplied is a reduction potential in the case where the potential of the counter electrode 408 is used as a reference potential or a reduction potential in the case where a reference electrode is provided in the electrochemical cell and the potential of the reference electrode is used as a reference potential. For example, when the counter electrode 408 and the reference electrode are each made of lithium-ion metal, the reduction potential to be supplied is a reduction potential determined relative to the redox potential of the lithium metal (vs. Li/Li$^+$). Through this step, reduction current flows through the electrochemical cell (closed circuit) when the graphene oxide is reduced. Thus, to examine whether the graphene oxide is reduced, the reduction current needs to be checked sequentially; the state where the reduction current is below a certain value (where there is no peak corresponding to the reduction current) is regarded as the state where the graphene oxide is reduced (where the reduction reaction is completed).

In controlling the potential of the conductor 407, the potential of the conductor 407 may be fixed to the reduction potential of the graphene oxide or may be swept so as to include the reduction potential of the graphene oxide. Further, the sweeping may be periodically repeated like in cyclic voltammetry. Although there is no limitation on the sweep rate of the potential of the conductor 407, it is preferably higher than or equal to 0.005 mV/s. and lower than or equal to 1 mV/s. Note that the potential of the conductor 407 may be swept either from a higher potential to a lower potential or from a lower potential to a higher potential.

Although the reduction potential of the graphene oxide slightly varies depending on the structure of the graphene oxide (e.g., the presence or absence of a functional group and formation of graphene oxide salt) and the way to control the potential (e.g., the sweep rate), it is approximately 2.0 V (vs. Li/Li$^+$). Specifically, the potential of the conductor 407 may be controlled so as to fall within the range of 1.6 V to 2.4 V (vs. Li/Li$^+$).

Through the above steps, the graphene can be formed over the conductor 407. In the case where electrochemical reduction treatment is performed, a proportion of $C(sp^2)$—$C(sp^2)$ double bonds is higher than that of graphene formed by heat treatment; therefore, the graphene having high conductivity can be formed over the negative electrode active material layer 309.

The negative electrode active material layer 309 may be predoped with lithium through the graphene after the graphene is formed over the conductor 407. As a predoping method of lithium, a lithium layer may be formed on a surface of the negative electrode active material layer 309 by a sputtering method. Alternatively, a lithium foil is provided on the surface of the negative electrode active material layer 309, whereby the negative electrode active material layer 309 can be predoped with lithium.

The separator 310 can be formed using an insulator such as cellulose (paper), polyethylene with pores, or polypropylene with pores.

As an electrolyte of the electrolyte solution, a material which contains carrier ions is used. Typical examples of the electrolyte include lithium salts such as $LiClO_4$, $LiAsF_6$, $LiBF_4$, $LiPF_6$, and $Li(C_2F_5SO_2)_2N$.

In the case where carrier ions are alkali metal ions other than lithium ions, alkaline-earth metal ions, beryllium ions, or magnesium ions, the electrolyte may contain, instead of lithium in the lithium salts, an alkali metal (e.g., sodium or potassium), an alkaline-earth metal (e.g., calcium, strontium, or barium), beryllium, or magnesium.

As a solvent of the electrolyte solution, a material in which carrier ions can transfer is used. As the solvent of the electrolyte solution, an aprotic organic solvent is preferably used. Typical examples of aprotic organic solvents include ethylene carbonate (EC), propylene carbonate, dimethyl carbonate, diethyl carbonate (DEC), γ-butyrolactone, acetonitrile, dimethoxyethane, and tetrahydrofuran, and one or more of these materials can be used. When a gelled polymer material is used as the solvent of the electrolyte solution, safety against liquid leakage and the like is improved. Further, the lithium-ion secondary battery can be thinner and more lightweight. Typical examples of a gelled polymer material include a silicon gel, an acrylic gel, an acrylonitrile gel, polyethylene oxide, polypropylene oxide, and a fluorine-based polymer. Alternatively, the use of one or more of ionic liquids (room temperature molten salts) which are less likely to burn and volatilize as the solvent of the electrolyte solution can prevent the secondary battery from exploding or catching fire even when the secondary battery internally shorts out or the internal temperature increases due to overcharging or the like.

Instead of the electrolyte solution, a solid electrolyte including a sulfide-based inorganic material, an oxide-based inorganic material, or the like, or a solid electrolyte including a polyethylene oxide (PEO)-based polymer material or the like can be used. When the solid electrolyte is used, a separator or a spacer is not necessary. Further, the battery can be entirely solidified; therefore, there is no possibility of liquid leakage and thus the safety of the battery is dramatically increased.

A metal having corrosion resistance, such as nickel, aluminum, or titanium, an alloy of such a metal, and an alloy of such a metal and another metal (stainless steel or the like) can be used for the positive electrode can 301 and the negative electrode can 302. It is particularly preferable to plate a corrosive metal with nickel or the like in order to prevent corrosion by the electrolyte solution, which occurs due to charge/discharge of the secondary battery. The positive electrode can 301 and the positive electrode 304 are electrically connected to each other, and the negative electrode can 302 and the negative electrode 307 are electrically connected to each other.

The negative electrode 307, the positive electrode 304, and the separator 310 are immersed in the electrolyte. Then, as illustrated in FIG. 3B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 interposed therebetween. In such a manner, the coin-type secondary battery 300 is manufactured.

Next, an example of a laminated secondary battery will be described with reference to FIG. 5.

Figure 5:
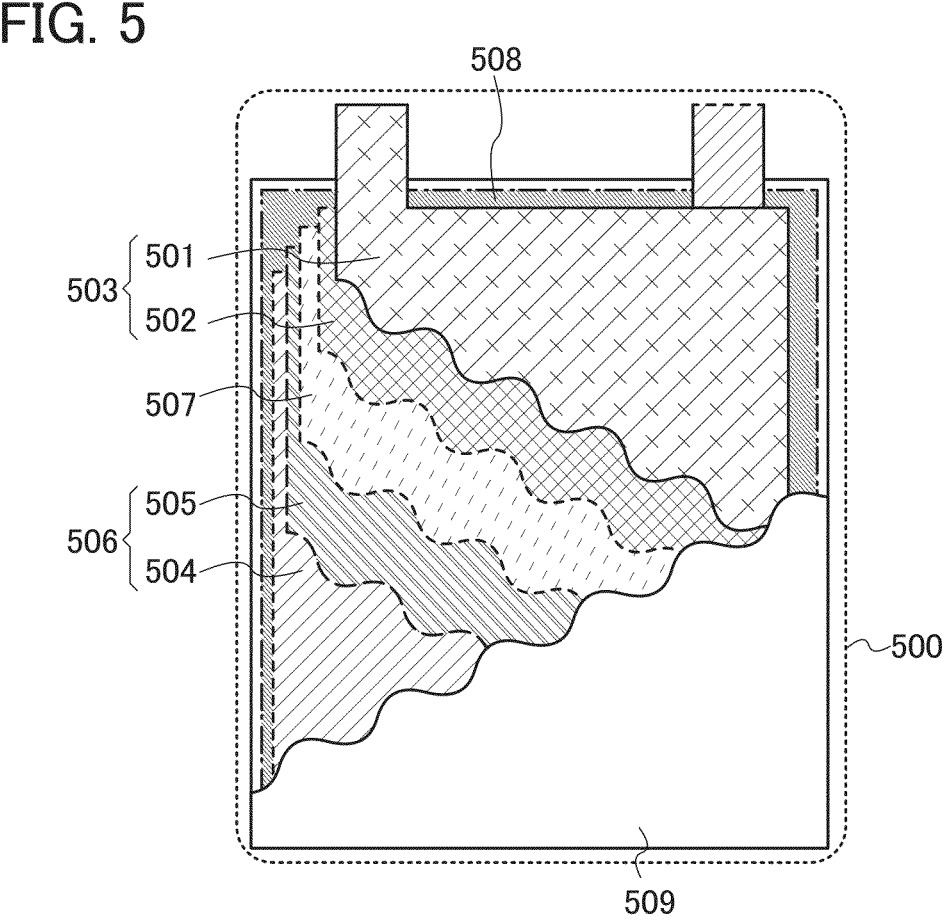
FIG. 5 illustrates an example of a lithium-ion secondary battery.

A laminated secondary battery 500 illustrated in FIG. 5 includes a positive electrode 503 including a positive electrode current collector 501 and a positive electrode active material layer 502, a negative electrode 506 including a negative electrode current collector 504 and a negative electrode active material layer 505, a separator 507, an electrolyte solution 508, and a housing 509. The separator 507 is placed between the positive electrode 503 and the negative electrode 506 provided in the housing 509. The housing 509 is filled with the electrolyte solution 508.

In the secondary battery 500 illustrated in FIG. 5, the positive electrode current collector 501 and the negative electrode current collector 504 also function as terminals for electrical contact with the outside. For this reason, each of the positive electrode current collector 501 and the negative electrode current collector 504 is arranged outside the housing 509 so as to be partly exposed.

For the housing 509 of the laminated secondary battery 500, a laminate film, a polymer film, a metal film, or the like is preferably used.

A positive electrode according to one embodiment of the present invention is used as each of the positive electrodes of the secondary batteries 300 and 500 described in this embodiment. Thus, the capacity of each of the secondary batteries 300 and 500 can be increased and cycle characteristics thereof can be improved.

This embodiment can be combined with any of the other embodiments as appropriate.

Embodiment 3

A lithium-ion secondary battery of one embodiment of the present invention can be used for power supplies of a variety of electrical appliances.

Specific examples of electrical appliances each utilizing the lithium-ion secondary battery of one embodiment of the present invention are as follows: display devices of televisions, monitors, and the like, lighting devices, desktop personal computers and laptop personal computers, word processors, image reproduction devices which reproduce still images or moving images stored in recording media such as digital versatile discs (DVDs), portable compact disc (CD) players, radio receivers, tape recorders, headphone stereos, stereos, clocks such as table clocks and wall clocks, cordless phone handsets, transceivers, portable wireless devices, cellular phones, car phones, portable game machines, calculators, portable information terminals, electronic notebooks, e-book readers, electronic translators, audio input devices, cameras such as still cameras and video cameras, electric shavers, high-frequency heating appliances such as microwave ovens, electric rice cookers, electric washing machines, electric vacuum cleaners, water heaters, electric fans, hair dryers, air-conditioning systems such as air conditioners, humidifiers, and dehumidifiers, dishwashers, dish dryers, clothes dryers, futon dryers, electric refrigerators, electric freezers, electric refrigerator-freezers, freezers for preserving DNA, flashlights, electric power tools such as chain saws, smoke detectors, and medical equipment such as dialyzers. Further, industrial equipment such as guide lights, traffic lights, belt conveyors, elevators, escalators, industrial robots, power storage systems, and power storage devices for leveling the amount of power supply and smart grid can be given. In addition, moving objects driven by electric motors using power from the lithium-ion secondary batteries are also included in the category of electrical appliances. Examples of the moving objects are electric vehicles (EV), hybrid electric vehicles (HEV) which include both an internal-combustion engine and a motor, plug-in hybrid electric vehicles (PHEV), tracked vehicles in which caterpillar tracks are substituted for wheels of these vehicles, motorized bicycles including motor-assisted bicycles, motorcycles, electric wheelchairs, golf carts, boats or ships, submarines, helicopters, aircrafts, rockets, artificial satellites, space probes, planetary probes, and spacecrafts.

In the above electrical appliances, the lithium-ion secondary battery of one embodiment of the present invention can be used as a main power supply for supplying enough power for almost the whole power consumption. Alternatively, in the above electrical appliances, the lithium-ion secondary battery of one embodiment of the present invention can be used as an uninterruptible power supply which can supply power to the electrical appliances when the supply of power from the main power supply or a commercial power supply is stopped. Still alternatively, in the above electrical appliances, the lithium-ion secondary battery of one embodiment of the present invention can be used as an auxiliary power supply for supplying power to the electrical appliances at the same time as the power supply from the main power supply or a commercial power supply.

Figure 6:
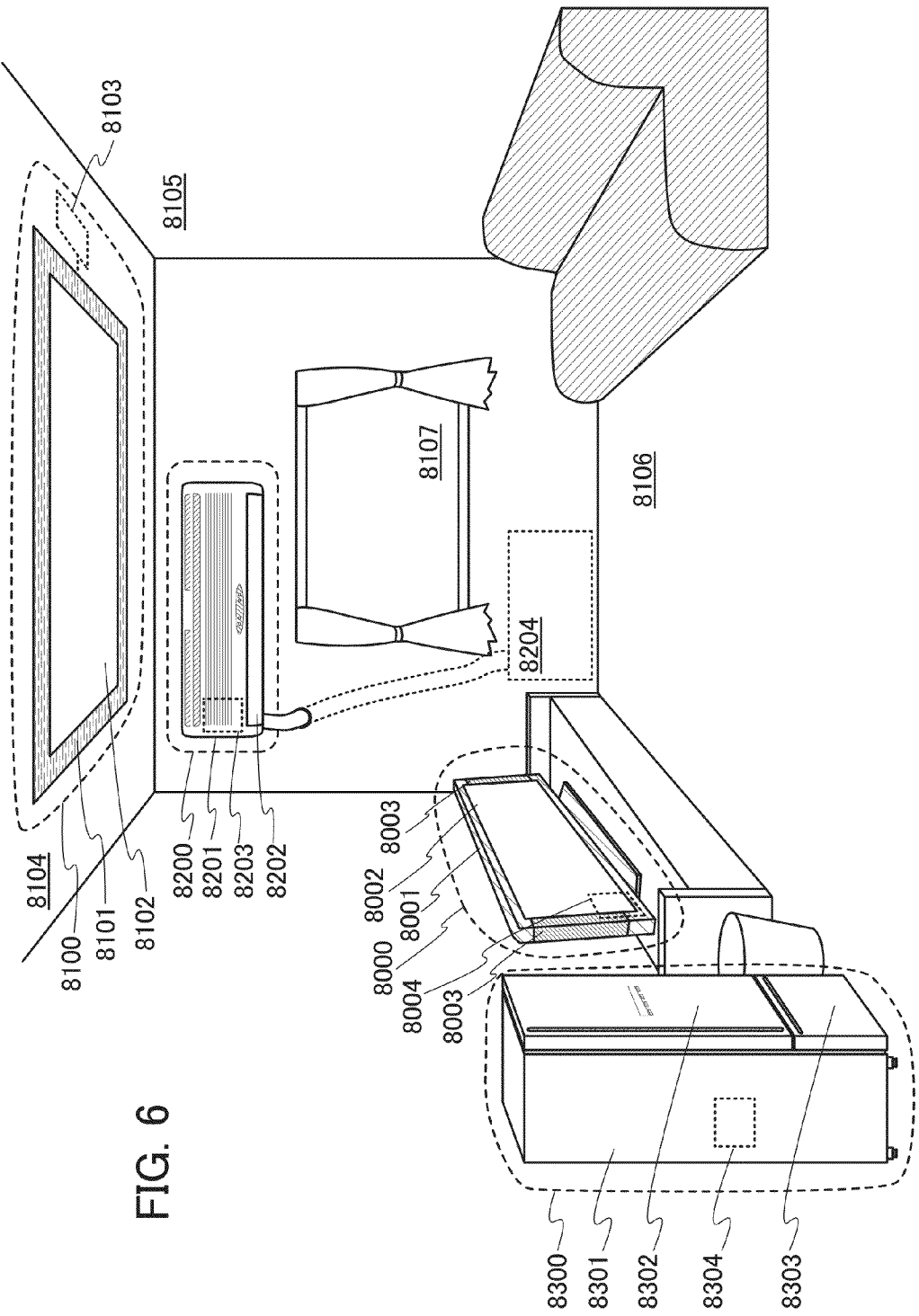
FIG. 6 illustrates application examples of lithium-ion secondary batteries.

FIG. 6 illustrates specific structures of the above electrical appliances. In FIG. 6, a display device 8000 is an example of an electrical appliance including a lithium-ion secondary battery 8004 of one embodiment of the present invention. Specifically, the display device 8000 corresponds to a display device for TV broadcast reception and includes a housing 8001, a display portion 8002, speaker portions 8003, the lithium-ion secondary battery 8004, and the like. The lithium-ion secondary battery 8004 of one embodiment of the present invention is provided in the housing 8001. The display device 8000 can receive power from a commercial power supply. Alternatively, the display device 8000 can use power stored in the lithium-ion secondary battery 8004. Thus, the display device 8000 can be operated with the use of the lithium-ion secondary battery 8004 of one embodiment of the present invention as an uninterruptible power supply even when power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 8002.

Note that the display device includes, in its category, all of information display devices for personal computers, advertisement displays, and the like besides TV broadcast reception.

In FIG. 6, an installation lighting device 8100 is an example of an electrical appliance including a lithium-ion secondary battery 8103 of one embodiment of the present invention. Specifically, the lighting device 8100 includes a housing 8101, a light source 8102, the lithium-ion secondary battery 8103, and the like. Although FIG. 6 illustrates the case where the lithium-ion secondary battery 8103 is provided in a ceiling 8104 on which the housing 8101 and the light source 8102 are installed, the lithium-ion secondary battery 8103 may be provided in the housing 8101. The lighting device 8100 can receive power from a commercial power supply. Alternatively, the lighting device 8100 can use power stored in the lithium-ion secondary battery 8103. Thus, the lighting device 8100 can be operated with the use of the lithium-ion secondary battery 8103 of one embodiment of the present invention as an uninterruptible power supply even when power cannot be supplied from a commercial power supply due to power failure or the like.

Note that although the installation lighting device 8100 provided in the ceiling 8104 is illustrated in FIG. 6 as an example, the lithium-ion secondary battery of one embodiment of the present invention can be used as an installation lighting device provided in, for example, a wall 8105, a floor 8106, a window 8107, or the like other than the ceiling 8104. Alternatively, the lithium-ion secondary battery can be used in a tabletop lighting device or the like.

As the light source 8102, an artificial light source which emits light artificially by using power can be used. Specifically, an incandescent lamp, a discharge lamp such as a fluorescent lamp, and light-emitting elements such as an LED or an organic EL element are given as examples of the artificial light source.

In FIG. 6, an air conditioner including an indoor unit 8200 and an outdoor unit 8204 is an example of an electrical appliance including a lithium-ion secondary battery 8203 of one embodiment of the present invention. Specifically, the indoor unit 8200 includes a housing 8201, an air outlet 8202, the lithium-ion secondary battery 8203, and the like. Although FIG. 6 illustrates the case where the lithium-ion secondary battery 8203 is provided in the indoor unit 8200, the lithium-ion secondary battery 8203 may be provided in the outdoor unit 8204. Alternatively, the lithium-ion secondary batteries 8203 may be provided in both the indoor unit 8200 and the outdoor unit 8204. The air conditioner can receive power from a commercial power supply. Alternatively, the air conditioner can use power stored in the lithium-ion secondary battery 8203. Particularly in the case where the lithium-ion secondary batteries 8203 are provided in both the indoor unit 8200 and the outdoor unit 8204, the air conditioner can be operated with the use of the lithium-ion secondary battery 8203 of one embodiment of the present invention as an uninterruptible power supply even when power cannot be supplied from a commercial power supply due to power failure or the like.

Note that although the split-type air conditioner including the indoor unit 8200 and the outdoor unit 8204 is illustrated in FIG. 6 as an example, the lithium-ion secondary battery of one embodiment of the present invention can be used in an air conditioner in which the functions of an indoor unit and an outdoor unit are integrated in one housing.

In FIG. 6, an electric refrigerator-freezer 8300 is an example of an electrical appliance including a lithium-ion secondary battery 8304 of one embodiment of the present invention. Specifically, the electric refrigerator-freezer 8300 includes a housing 8301, a door for a refrigerator 8302, a door for a freezer 8303, the lithium-ion secondary battery 8304, and the like. The lithium-ion secondary battery 8304 is provided in the housing 8301 in FIG. 6. The electric refrigerator-freezer 8300 can receive power from a commercial power supply. Alternatively, the electric refrigerator-freezer 8300 can use power stored in the lithium-ion secondary battery 8304. Thus, the electric refrigerator-freezer 8300 can be operated with the use of the lithium-ion secondary battery 8304 of one embodiment of the present invention as an uninterruptible power supply even when power cannot be supplied from a commercial power supply due to power failure or the like.

Note that among the electrical appliances described above, a high-frequency heating apparatus such as a microwave oven and an electrical appliance such as an electric rice cooker require high power in a short time. The tripping of a breaker of a commercial power supply in use of an electrical appliance can be prevented by using the lithium-ion secondary battery of one embodiment of the present invention as an auxiliary power supply for supplying power which cannot be supplied enough by the commercial power supply.

In addition, in a time period when electrical appliances are not used, particularly when the proportion of the amount of power which is actually used to the total amount of power which can be supplied from a commercial power supply source (such a proportion referred to as a usage rate of power) is low, power can be stored in the lithium-ion secondary battery, whereby the usage rate of power can be reduced in a time period when the electrical appliances are used. For example, in the case of the electric refrigerator-freezer 8300, power can be stored in the lithium-ion secondary battery 8304 in night time when the temperature is low and the door for a refrigerator 8302 and the door for a freezer 8303 are not often opened and closed. On the other hand, in daytime when the temperature is high and the door for a refrigerator 8302 and the door for a freezer 8303 are frequently opened and closed, the lithium-ion secondary battery 8304 is used as an auxiliary power supply; thus, the usage rate of power in daytime can be reduced.

This embodiment can be implemented in combination with any of the other embodiments as appropriate.

Embodiment 4

Next, a portable information terminal which is an example of the electrical appliance will be described with reference to FIGS. 7A to 7C.

Figure 7A:
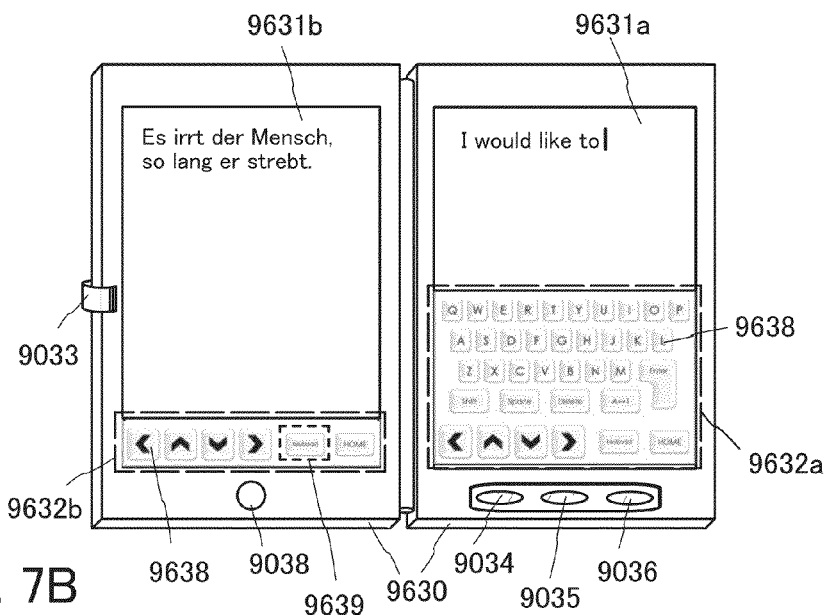
FIGS. 7A to 7C illustrate an application example of a lithium-ion secondary battery.
Figure 7B:
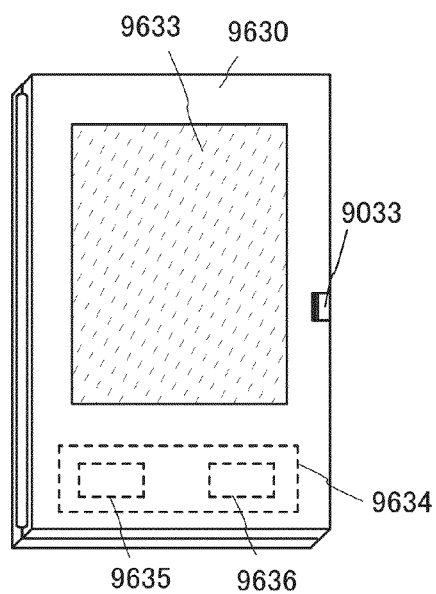

FIGS. 7A and 7B illustrate a tablet terminal that can be folded. In FIG. 7A, the tablet terminal is opened, and includes a housing 9630, a display portion 9631a, a display portion 9631b, a switch 9034 for switching display modes, a power switch 9035, a switch 9036 for switching to power-saving mode, a fastener 9033, and an operation switch 9038.

Part of the display portion 9631a can be a touch panel region 9632a and data can be input when a displayed operation key 9638 is touched. Although a structure in which a half region in the display portion 9631a has only a display function and the other half region has a touch panel function is shown as an example, the display portion 9631a is not limited to the structure. The whole region in the display portion 9631a may have a touch panel function. For example, keyboard buttons can be displayed on the entire display portion 9631a to be used as a touch panel, and the display portion 9631b can be used as a display screen.

As in the display portion 9631a, part of the display portion 9631b can be a touch panel region 9632b. A switching button 9639 for showing/hiding a keyboard of the touch panel is touched with a finger, a stylus, or the like, so that keyboard buttons can be displayed on the display portion 9631b.

Touch input can be performed in the touch panel region 9632a and the touch panel region 9632b at the same time.

The switch 9034 for switching display modes can switch the display between portrait mode, landscape mode, and the like, and between monochrome display and color display, for example. The switch 9036 for switching to power-saving mode can control display luminance to be optimal in accordance with the amount of external light in use of the tablet terminal which is detected by an optical sensor incorporated in the tablet terminal. Another detection device including a sensor or the like for detecting inclination, such as a gyroscope or an acceleration sensor, may be incorporated in the tablet terminal, in addition to the optical sensor.

Note that FIG. 7A illustrates an example in which the display portion 9631a and the display portion 9631b have the same display area; however, without limitation thereon, one of the display portions may be different from the other display portion in size and display quality. For example, one display panel may be capable of higher-definition display than the other display panel.

The tablet terminal is closed in FIG. 7B. The tablet terminal includes the housing 9630, a solar cell 9633, a charge/discharge control circuit 9634, a battery 9635, and a DC-DC converter 9636. In FIG. 7B, a structure including the battery 9635 and the DC-DC converter 9636 is illustrated as an example of the charge/discharge control circuit 9634. The lithium-ion secondary battery described in any of the above embodiments is used as the battery 9635.

Since the tablet terminal can be folded, the housing 9630 can be closed when the tablet terminal is not used. As a result, the display portion 9631a and the display portion 9631b can be protected; thus, a tablet terminal which has excellent durability and excellent reliability also in terms of long-term use can be provided.

In addition, the tablet terminal illustrated in FIGS. 7A and 7B can have a function of displaying a variety of kinds of data (e.g., a still image, a moving image, and a text image), a function of displaying a calendar, a date, the time, or the like on the display portion, a touch-input function of operating or editing the data displayed on the display portion by touch input, a function of controlling processing by a variety of kinds of software (programs), and the like.

The solar cell 9633 provided on a surface of the tablet terminal can supply power to the touch panel, the display portion, a video signal processing portion, or the like. Note that the solar cell 9633 can be provided on one or both surfaces of the housing 9630, in which case the battery 9635 can be charged efficiently. When the lithium-ion secondary battery described in any of the above embodiments is used as the battery 9635, there is an advantage such as a reduction in size.

The structure and the operation of the charge/discharge control circuit 9634 illustrated in FIG. 7B will be described with reference to a block diagram in FIG. 7C. The solar cell 9633, the battery 9635, the DC-DC converter 9636, a converter 9637, switches SW1 to SW3, and the display portion 9631 are illustrated in FIG. 7C, and the battery 9635, the DC-DC converter 9636, the converter 9637, and the switches SW1 to SW3 correspond to the charge/discharge control circuit 9634 in FIG. 7B.

First, an example of the operation in the case where power is generated by the solar cell 9633 using external light is described. The voltage of power generated by the solar cell is raised or lowered by the DC-DC converter 9636 so that the power has a voltage for charging the battery 9635. Then, when the power from the solar cell 9633 is used for the operation of the display portion 9631, the switch SW1 is turned on and the voltage of the power is raised or lowered by the converter 9637 so as to be a voltage needed for the display portion 9631. In addition, when display on the display portion 9631 is not performed, the switch SW1 is turned off and the switch SW2 is turned on so that charge of the battery 9635 may be performed.

Note that the solar cell 9633 is described as an example of a power generation means; however, without limitation thereon, the battery 9635 may be charged using another power generation means such as a piezoelectric element or a thermoelectric conversion element (Peltier element). For example, the battery 9635 may be charged with a non-contact power transmission module which is capable of charging by transmitting and receiving power by wireless (without contact), or another charging means may be used in combination.

Figure 7C:
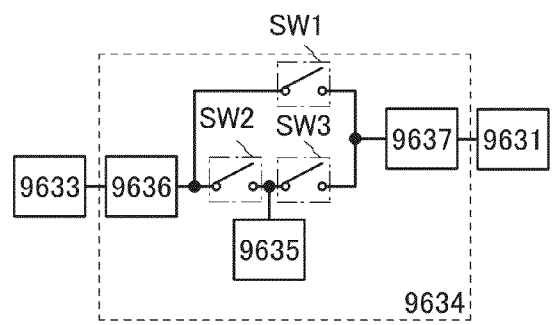

It is needless to say that one embodiment of the present invention is not limited to the electrical appliance illustrated in FIGS. 7A to 7C as long as the lithium-ion secondary battery described in any of the above embodiments is included.

Embodiment 5

Further, an example of the moving object which is an example of the electrical appliance will be described with reference to FIGS. 8A and 8B.

The lithium-ion secondary battery described in any of the above embodiments can be used as a control battery. The control battery can be externally charged by electric power supply using a plug-in technique or contactless power feeding. Note that in the case where the moving object is an electric railway vehicle, the electric railway vehicle can be charged by electric power supply from an overhead cable or a conductor rail.

Figure 8A:
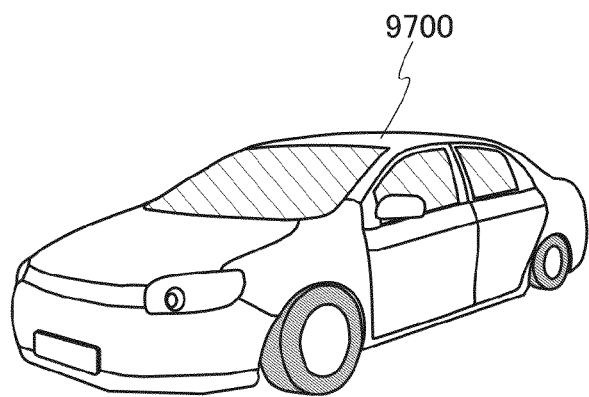
FIGS. 8A and 8B illustrate an application example of a lithium-ion secondary battery.
Figure 8B:
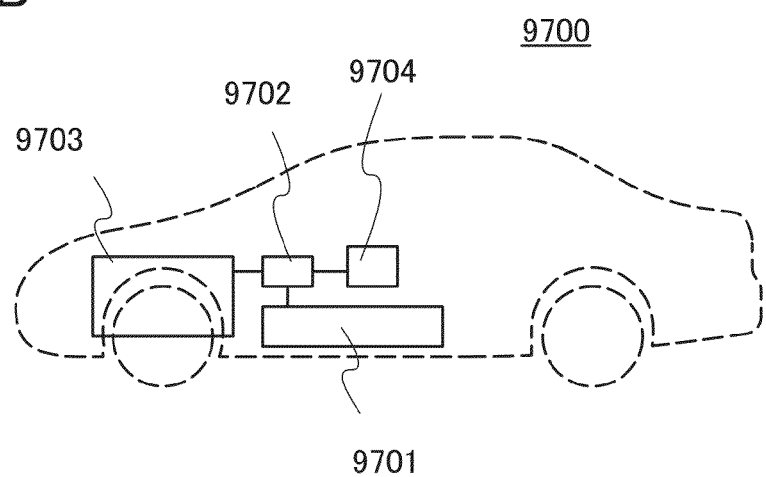

FIGS. 8A and 8B illustrate an example of an electric vehicle. An electric vehicle 9700 is equipped with a lithium-ion secondary battery 9701. The output of the electric power of the lithium-ion secondary battery 9701 is adjusted by a control circuit 9702 and the electric power is supplied to a driving device 9703. The control circuit 9702 is controlled by a processing unit 9704 including a ROM, a RAM, a CPU, or the like which is not illustrated.

The driving device 9703 includes a DC motor or an AC motor either alone or in combination with an internal-combustion engine. The processing unit 9704 outputs a control signal to the control circuit 9702 based on input data such as data of operation (e.g., acceleration, deceleration, or stop) by a driver or data during driving (e.g., data on an upgrade or a downgrade, or data on a load on a driving wheel) of the electric vehicle 9700. The control circuit 9702 adjusts the electric energy supplied from the lithium-ion secondary battery 9701 in accordance with the control signal of the processing unit 9704 to control the output of the driving device 9703. In the case where the AC motor is mounted, although not illustrated, an inverter which converts direct current into alternate current is also incorporated.

Charge of the lithium-ion secondary battery 9701 can be performed by external electric power supply using a plug-in technique. For example, the lithium-ion secondary battery 9701 is charged through a power plug from a commercial power supply. The lithium-ion secondary battery 9701 can be charged by converting external power into DC constant voltage having a predetermined voltage level through a converter such as an AC-DC converter. When the lithium-ion secondary battery of one embodiment of the present invention is provided as the lithium-ion secondary battery 9701, a shorter charging time can be brought about and improved convenience can be realized. Moreover, the higher charging and discharging rate of the lithium-ion secondary battery 9701 can contribute to greater acceleration and excellent performance of the electric vehicle 9700. When the lithium-ion secondary battery 9701 itself can be more compact and more lightweight as a result of improved characteristics of the lithium-ion secondary battery 9701, the vehicle can be lightweight and fuel efficiency can be increased.

This embodiment can be implemented in combination with any of the other embodiments as appropriate.

Example 1

This example shows results of formation of a positive electrode by the method described in Embodiment 1.

First, samples used in this example are described.

First, a method for forming Sample 1 is described. As a dispersion medium, NMP (produced by Tokyo Chemical Industry Co., Ltd.) of 60 wt % was prepared with respect to the total weight of graphene oxide, lithium iron phosphate, and PVDF. Graphene oxide was dispersed in the NMP at 2 wt % with respect to the total weight of the graphene oxide, the lithium iron phosphate, and the PVDF, and then, lithium iron phosphate was added at 93 wt % and mixing was performed in a state where the amount of the solvent is small to the mixture. After PVDF was added to the mixture of the graphene oxide and the lithium iron phosphate at 5 wt % as a binder, NMP was further added as the dispersion medium and mixed, whereby a positive electrode paste was formed.

The positive electrode paste formed by the above-described method was applied to a current collector (aluminum with a thickness of 20 μm), dried under an air atmosphere at 80° C. for 40 minutes, and then dried under a reduced-pressure atmosphere at 170° C. for 10 hours.

Next, a method for forming Comparative Sample 2 is described. As a binder, PVDF of 5 wt % was prepared and lithium iron phosphate was added at 93 wt % and mixed. Then, graphene oxide was added at 2 wt % with respect to the total weight of the graphene oxide, the lithium iron phosphate, and the PVDF and mixing was performed in a state where the amount of the solvent is small to the mixture. In addition, NMP was added to the mixture of the PVDF, the lithium iron phosphate, and the graphene oxide at 50 wt % with respect to the total weight of the PVDF, the lithium iron phosphate, and the graphene oxide and mixing was performed in a state where the amount of the solvent is small to the mixture. Next, NMP was further added to control the viscosity and mixed, whereby a positive electrode paste was formed.

The positive electrode paste formed by the above-described method was applied to a current collector (aluminum with a thickness of 20 μm), dried under an air atmosphere at 80° C. for 40 minutes, and then dried under a reduced-pressure atmosphere at 170° C. for 10 hours.

Battery 3 and Battery 4 (comparative example) were formed by using the following: Sample 1 and Comparative Sample 2 from each of which a circle is stamped out together with the current collector as the respective positive electrodes; metallic lithium for negative electrodes; a mixed solution of ethylene carbonate (EC) and diethyl carbonate (DEC) (with a volume ratio of 1:1) in which lithium hexafluorophosphate ($LiPF_6$) (concentration: 1 mol/L) was dissolved, as electrolytes; and polypropylene separators as separators.

Next, discharge characteristics of each of Battery 3 and Battery 4 were measured and then, charge characteristics thereof were measured. Note that the discharging rate was 0.2 C and the charging rate was 0.2 C. The charging was stopped when the constant voltage was 4.3 V and the current became equivalent to 0.016 C.

Figure 14:
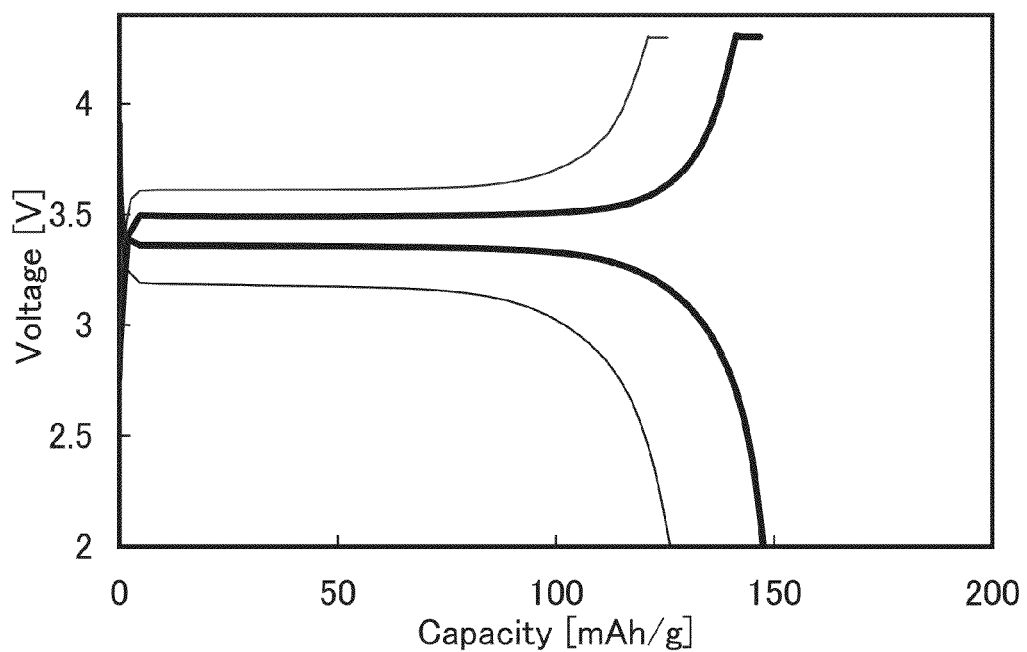
FIG. 14 shows characteristics of lithium-ion secondary batteries formed in Example.

FIG. 14 shows discharge characteristics of Battery 3 and Battery 4. In FIG. 14, the horizontal axis indicates discharge capacity per weight [mAh/g] of the active material and the vertical axis indicates voltage [V]. Further, in FIG. 14, the bold solid line indicates the discharge characteristics of Battery 3 and the fine solid line indicates the discharge characteristics of Battery 4.

It is found from results in FIG. 14 that as for the discharge characteristics, Battery 3 has higher capacity and a higher plateau potential than Battery 4 which is a comparative example.

It is considered that the positive electrode used in Battery 3 has a larger contact area between the lithium iron phosphate and the graphene than the positive electrode used in Battery 4. It is also considered the graphene is uniformly dispersed in the positive electrode used in Battery 3.

The above results show that a battery having improved discharge capacity and a higher plateau potential can be obtained by application of a forming method according to one embodiment of the present invention.

Example 2

This example shows results of formation of a positive electrode by the method described in Embodiment 1.

First, samples used in this example are described.

Sample A was formed in such a manner that a positive electrode paste formed by mixing active material (lithium iron phosphate) particles, a binder (polyvinylidene fluoride (PVDF) produced by KUREHA CORPORATION), and a conductive additive (graphene oxide) was applied to a current collector (aluminum) and then was dried and reduced. Sample B (Comparative Example) was formed in such a manner that a mixture of active material (lithium iron phosphate coated with carbon) particles, a binder (polyvinylidene fluoride (PVDF) produced by KUREHA CORPORATION), and a conductive additive (acetylene black produced by DENKI KAGAKU KOGYO KABUSHIKI KAISHA) was applied to a current collector (aluminum) and then dried.

A method for forming lithium iron phosphate used as the active material of Sample A is described. First, lithium carbonate ($Li_2CO_3$), iron oxalate ($FeC_2O_4 \cdot 2H_2O$), and ammonium dihydrogen phosphate ($NH_4H_2PO_4$) which were source materials were weighed out such that the molar ratio therebetween was 1:2:2, and were ground and mixed with a wet ball mill (the ball diameter was 3 mm and acetone was used as a solvent) at 400 rpm for 2 hours. After the drying, pre-baking was performed at 350° C. for 10 hours under a nitrogen atmosphere.

Next, grinding and mixing were performed with a wet ball mill (the ball diameter was 3 mm) at 400 rpm for 2 hours. Then, baking was performed at 600° C. for 10 hours under a nitrogen atmosphere.

Lithium iron phosphate coated with carbon, which was used as the active material of Sample B, was formed in a manner similar to that of lithium iron phosphate, which was used as the active material of Sample A, up to the step of pre-baking. Glucose was added to a solid at 10 wt % after the pre-baking, and then, grinding and mixing were performed with a wet ball mill (the ball diameter was 3 mm) at 400 rpm for 2 hours. Then, baking was performed at 600° C. for 10 hours under a nitrogen atmosphere.

Next, the graphene oxide that was formed is described. Potassium permanganate was added to a mixture of graphite (flake carbon) and concentrated sulfuric acid while being cooled at 0° C., its temperature was returned to room temperature, and the mixture was stirred for a total of 2 hours. After that, heating was performed at 35° C. for 30 minutes, pure water was added to the mixture, the mixture was stirred for 15 minutes while being heated, and a hydrogen peroxide solution was added thereto, so that a yellow-brown suspension containing graphite oxide was obtained. Furthermore, the obtained suspension was filtered, and hydrochloric acid was added, followed by washing with pure water. Then, ultrasonic treatment was performed for an hour, so that the graphite oxide was processed into the graphene oxide.

Next, a method for forming Sample A is described in detail. As the dispersion medium, NMP (produced by Tokyo Chemical Industry Co., Ltd.) of 60 wt % was prepared with respect to the total weight of graphene oxide, lithium iron phosphate, and PVDF. Graphene oxide was dispersed in the NMP at 2 wt % with respect to the total weight of the graphene oxide, the lithium iron phosphate, and the PVDF, and then, lithium iron phosphate (which was not coated with carbon) was added at 93 wt % and mixing was performed in a state where the amount of the solvent is small to the mixture. After PVDF was added to the mixture of the graphene oxide and the lithium iron phosphate at 5 wt % as the binder, NMP was added as the dispersion medium and mixed, whereby the positive electrode paste was formed.

The positive electrode paste formed by the above-described method was applied to a current collector (aluminum with a thickness of 20 μm), dried under an air atmosphere at 80° C. for 40 minutes, and then dried under a reduced-pressure atmosphere at 170° C. for 10 hours.

Next, a method for forming Sample B is described in detail. PVDF of 5 wt % was prepared as the binder, and lithium iron phosphate (which was coated with carbon) was added at 80 wt % and mixed. NMP was added at 60 wt % with respect to the total weight of acetylene black, the lithium iron phosphate, and the PVDF, acetylene black was added at 15 wt % with respect to the total weight of the acetylene black, the lithium iron phosphate, and the PVDF, and mixing was performed in a state where the amount of the solvent is small to the mixture. NMP was further added to the mixture of the PVDF, the lithium iron phosphate, and the acetylene black and mixed, whereby the positive electrode paste was formed.

The positive electrode paste formed by the above-described method was applied to a current collector (aluminum with a film thickness of 20 μm), dried under a reduced-pressure atmosphere at 135° C. for 40 minutes, and then dried under a reduced-pressure atmosphere at 170° C. for 10 hours.

Battery C and Battery D (comparative example) were formed by using the following: Sample A and Sample B from each of which a circle is stamped out together with the current collector as the respective positive electrodes; metallic lithium for negative electrodes; a mixed solution of ethylene carbonate (EC) and diethyl carbonate (DEC) (with a volume ratio of 1:1) in which lithium hexafluorophosphate ($LiPF_6$) (concentration: 1 mol/L) was dissolved, as electrolytes; and polypropylene separators as separators.

Next, discharge characteristics of each of Battery C and Battery D were measured and then, charge characteristics thereof were measured. Note that the discharging rate was 0.2 C and the charging rate was 0.2 C. The charging was stopped when the constant voltage was 4.3 V and the current became equivalent to 0.016 C.

Figure 9:
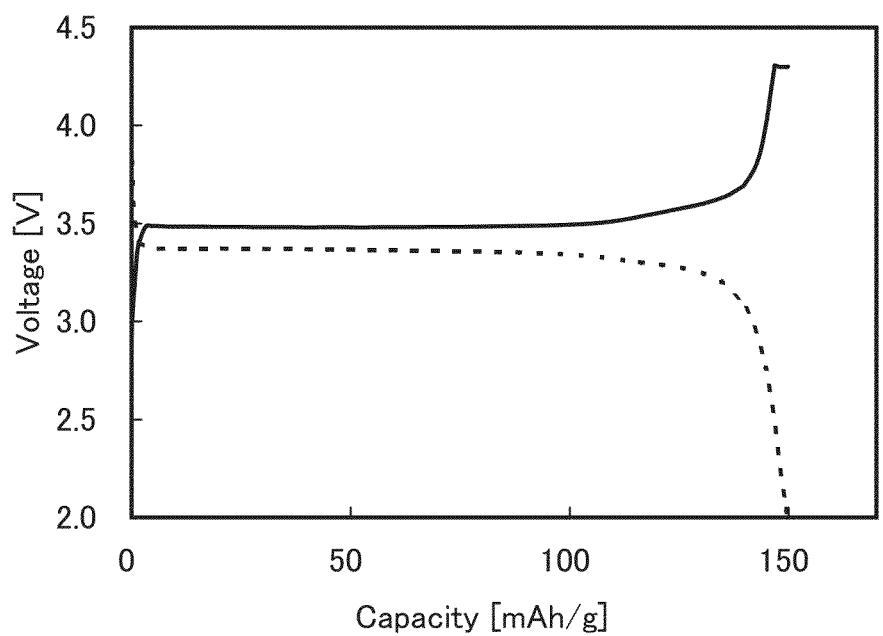
FIG. 9 shows characteristics of a lithium-ion secondary battery formed in Example.

FIG. 9 shows charge/discharge characteristics of Battery C. The horizontal axis indicates capacity per weight [mAh/g] of the active material, and the vertical axis indicates voltage [V]. The solid line indicates the charge characteristics, and the dashed line indicates the discharge characteristics.

Figure 10:
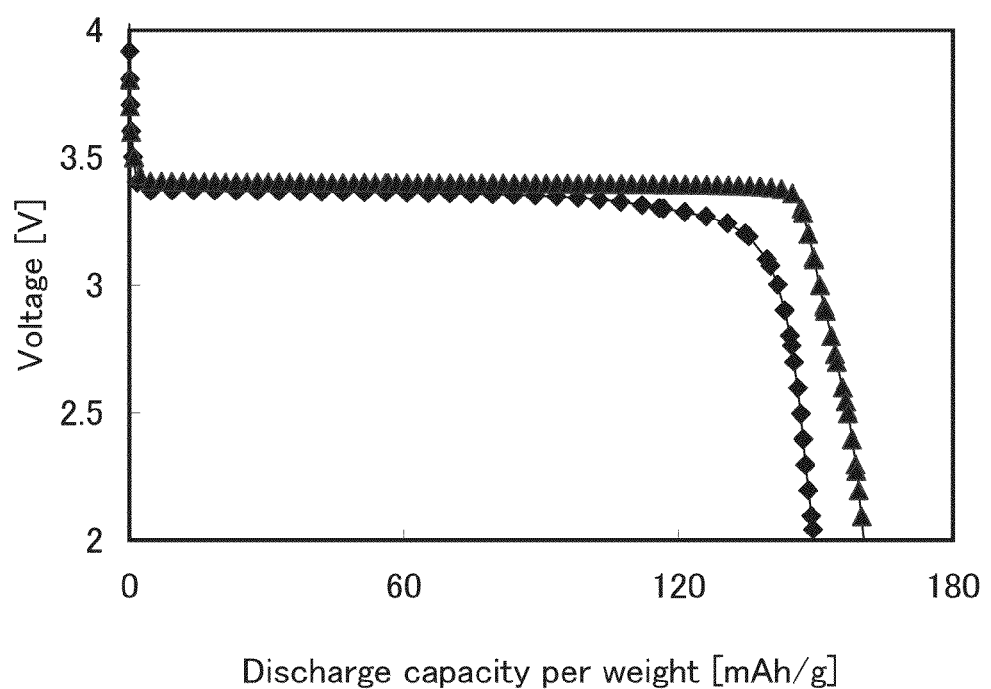
FIG. 10 shows characteristics of lithium-ion secondary batteries formed in Example.
Figure 11:
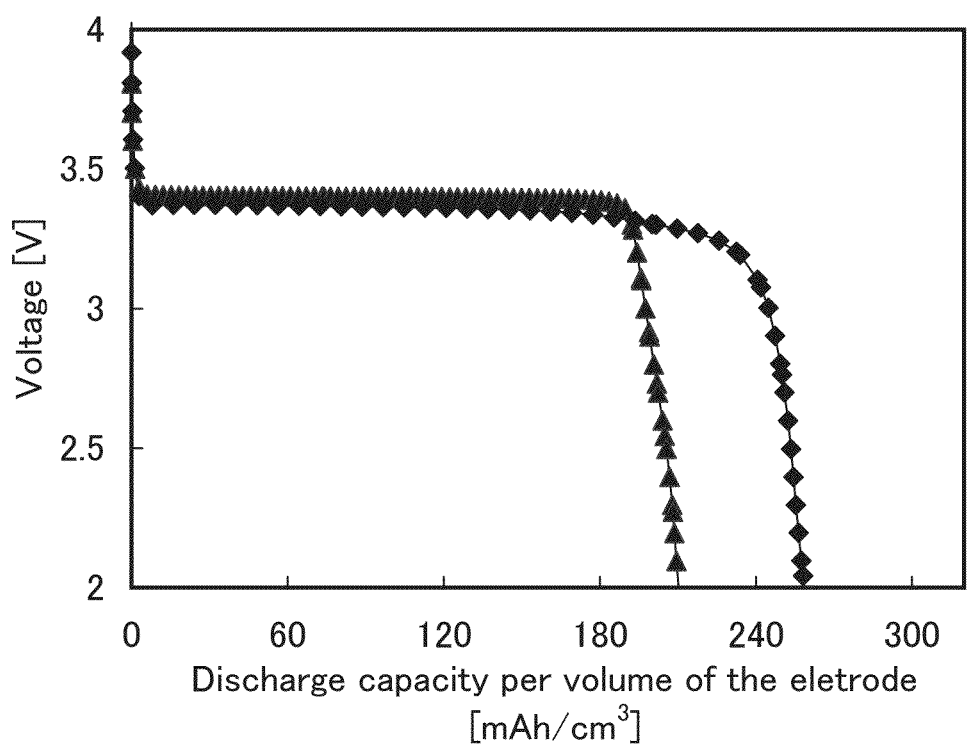
FIG. 11 shows characteristics of lithium-ion secondary batteries formed in Example.

Further, FIG. 10 and FIG. 11 each show discharge characteristics of Battery C and Battery D. In FIG. 10, the horizontal axis indicates discharge capacity per weight [mAh/g] of the active material, and the vertical axis indicates voltage [V]. In FIG. 11, the horizontal axis indicates discharge capacity per volume [mAh/cm$^3$] of the electrode, and the vertical axis indicates voltage [V]. In FIG. 10 and FIG. 11, diamonds represent discharge characteristics of Battery C, and triangles represent discharge characteristics of Battery D.

It is found from results in FIG. 9 that Battery C can have favorable charge/discharge characteristics. It is found from results in FIG. 10 that Battery C can have comparable discharge capacity per weight of the active material as compared with Battery D. It is found from results in FIG. 11 that Battery C has larger discharge capacity per volume of the electrode than Battery D by approximately 20%.

Battery E was formed by using the following: Sample A from which a circle is stamped out together with the current collector as the positive electrode; graphite for a negative electrode; a mixed solution of ethylene carbonate (EC) and diethyl carbonate (DEC) (with a volume ratio of 1:1) in which lithium hexafluorophosphate ($LiPF_6$) (concentration: 1 mol/L) was dissolved, as an electrolyte; and a polypropylene separator as a separator.

Next, charge/discharge cycle characteristics of Battery E were evaluated. In order to evaluate the cycle characteristics, charging and discharging were regarded as one cycle, and the one cycle was repeated 543 times. The charging rate and the discharging rate in the first cycle were each 0.2 C, and the charging rate and the discharging rate in the second and subsequent cycles were each 1 C. Charging and discharging were performed at a rate of 0.2 C every 200 cycles at a rate of 1 C.

Figure 12:
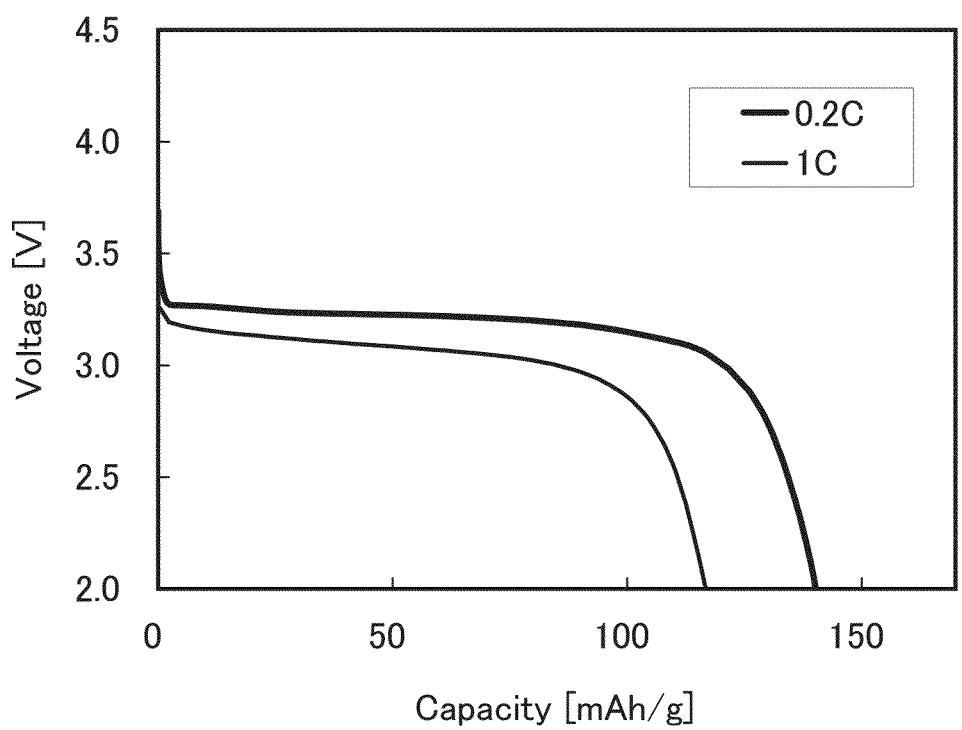
FIG. 12 shows characteristics of a lithium-ion secondary battery formed in Example.

FIG. 12 shows discharge characteristics of Battery E. In FIG. 12, the horizontal axis indicates discharge capacity per weight [mAh/g] of the active material, and the vertical axis indicates voltage [V]. The bold solid line indicates the discharge characteristics when the rate was 0.2 C, and the fine solid line indicates the discharge characteristics when the rate was 1 C.

It is found from results in FIG. 12 that Battery E has favorable rate characteristics because capacity at a rate of 1 C is 80% or more of capacity at a rate of 0.2 C in Battery E.

Figure 13:
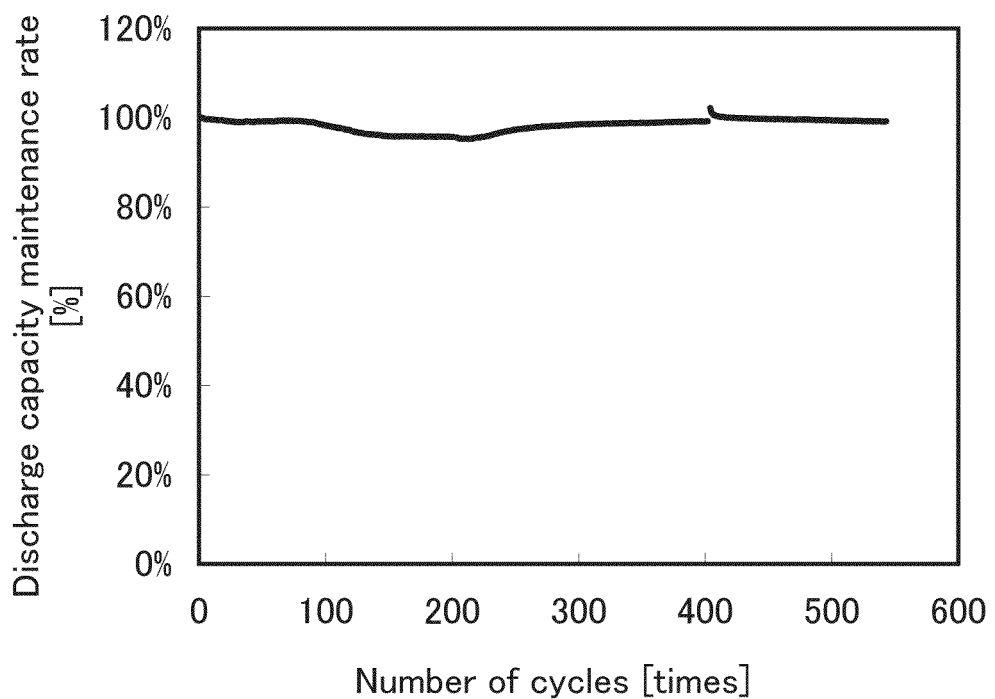
FIG. 13 shows characteristics of a lithium-ion secondary battery formed in Example.

FIG. 13 shows results of cycle characteristics of Battery E. In FIG. 13, the horizontal axis indicates the number of cycles [times], and the vertical axis indicates discharge capacity maintenance rate [%].

It is confirmed from the results of FIG. 13 that Battery E can substantially maintain initial capacity even after 500 cycles. Thus, it is found that Battery E has a long battery lifetime.

As one of possible factors of battery degradation, there is an increase in resistance when a granular conductive additive is separated from a positive electrode active material. However, as in this example, a state where sheet-like graphene is in contact with a plurality of positive electrode active materials can be maintained using a binder; thus, separation between the positive electrode active material and the graphene can be suppressed. Therefore, an increase in resistance can be suppressed, which enables suppression of battery degradation.

The above results show that the batteries according to this example have improved discharge capacity and improved cycle characteristics.

This application is based on Japanese Patent Application serial no. 2011-276235 filed with Japan Patent Office on Dec. 16, 2011, the entire contents of which are hereby incorporated by reference.

What is claimed is:

1. A method for forming a positive electrode of a battery, comprising the steps of:
   dispersing graphene oxide in a first medium;
   adding the first medium comprising the graphene oxide to form a first mixture comprising the graphene oxide and the positive electrode active material;
   mixing the first mixture to reduce aggregation of the positive electrode active material and the graphene oxide;
   adding a binder and a second medium to the first mixture to form a second mixture after mixing the first mixture;
   applying the second mixture to a positive electrode current collector; and
   drying the second mixture after applying the second mixture to the positive electrode current collector to form a positive electrode active material layer over the positive electrode current collector so that at least a part of the graphene oxide is reduced in the positive electrode active material layer.

2. The method for forming the positive electrode of the battery according to claim 1,
   wherein the positive electrode active material is lithium iron phosphate, $LiFeO_2$, $LiCoO_2$, $LiNiO_2$, $LiMn_2O_4$, $V_2O_5$, $Cr_2O_5$, $MnO_2$, $LiMPO_4$, $Li_{(2-j)}MSiO_4$, or a lithium-containing composite oxide having an olivine structure,
   wherein M is one or more of Fe, Mn, Co, and Ni, and
   wherein j is equal to 2 or less.

3. The method for forming the positive electrode of the battery according to claim 1, wherein the binder is a polymer organic compound.

4. The method for forming the positive electrode of the battery according to claim 1, wherein the binder is polyvinylidene fluoride.

5. The method for forming the positive electrode of the battery according to claim 1, wherein the battery is a lithium ion secondary battery.

6. The method for forming the positive electrode of the battery according to claim 1, wherein the graphene oxide comprises one or more groups selected from an epoxy group, a carbonyl group, a carboxyl group, and a hydroxyl group.

7. The method for forming the positive electrode of the battery according to claim 1, wherein a proportion of oxygen in the reduced graphene oxide is higher than or equal to 2% and lower than or equal to 11%.

8. The method for forming the positive electrode of the battery according to claim 1, wherein the first medium and the second medium are a same material.

9. The method for forming the positive electrode of the battery according to claim 1, wherein the second mixture comprises the first medium in the step of adding the binder and the second medium.

10. A method for manufacturing a battery comprising a positive electrode, a negative electrode, an electrolyte solution, and a separator,
    wherein a method of forming the positive electrode comprises the steps of:
    dispersing graphene oxide in a first medium;
    adding a positive electrode active material to the first medium comprising the graphene oxide to form a first mixture comprising the graphene oxide and the positive electrode active material;
    mixing the first mixture to reduce aggregation of the positive electrode active material and the graphene oxide;
    adding a binder and a second medium to the first mixture to form a second mixture after mixing the first mixture;
    applying the second mixture to a positive electrode current collector; and
    drying the second mixture after applying the second mixture to the positive electrode current collector to form a positive electrode active material layer over the positive electrode current collector so that at least a part of the graphene oxide is reduced to be graphene in the positive electrode active material layer.

11. The method for manufacturing the battery according to claim 10,
    wherein the positive electrode active material is lithium iron phosphate, $LiFeO_2$, $LiCoO_2$, $LiNiO_2$, $LiMn_2O_4$, $V_2O_5$, $Cr_2O_5$, $MnO_2$, $LiMPO_4$, $Li_{(2-j)}MSiO_4$, or a lithium-containing composite oxide having an olivine structure,
    wherein M is one or more of Fe, Mn, Co, and Ni, and
    wherein j is equal to 2 or less.

12. The method for manufacturing the battery according to claim 10, wherein the binder is a polymer organic compound.

13. The method for manufacturing the battery according to claim 10, wherein the binder is polyvinylidene fluoride.

14. The method for manufacturing the battery according to claim 10, wherein the battery is a lithium ion secondary battery.

15. The method for forming the battery according to claim 10, wherein a proportion of oxygen in the reduced graphene oxide is higher than or equal to 2% and lower than or equal to 11%.

16. The method for forming the battery according to claim 10, wherein the first medium and the second medium are a same material.

17. The method for forming the positive electrode of the battery according to claim 10, wherein the second mixture comprises the first medium in the step of adding the binder and the second medium.

18. A method for forming a positive electrode of a battery, comprising the steps of:
    mixing a first mixture comprising a positive electrode active material, graphene oxide and a first medium so that aggregation of the positive electrode active material and the graphene oxide is reduced in comparison with aggregation of the positive electrode active material before mixing the first mixture;
    adding a binder and a second medium to the first mixture to form a second mixture after mixing the first mixture;
    applying the second mixture to a positive electrode current collector; and
    drying the second mixture after applying the second mixture to the positive electrode current collector to form a positive electrode active material layer over the positive electrode current collector so that at least a part of the graphene oxide is reduced in the positive electrode active material layer.

19. The method for manufacturing the positive electrode of the battery according to claim 18,
    wherein the positive electrode active material is lithium iron phosphate, $LiFeO_2$, $LiCoO_2$, $LiNiO_2$, $LiMn_2O_4$, $V_2O_5$, $Cr_2O_5$, $MnO_2$, $LiMPO_4$, $Li_{(2-j)}MSiO_4$, or a lithium-containing composite oxide having an olivine structure,
    wherein M is one or more of Fe, Mn, Co, and Ni, and
    wherein j is equal to 2 or less.

20. The method for manufacturing the positive electrode of the battery according to claim 18, wherein the binder is polyvinylidene fluoride.

21. The method for manufacturing the positive electrode of the battery according to claim 18, wherein the battery is a lithium ion secondary battery.

22. The method for forming the positive electrode of the battery according to claim 18, wherein a proportion of oxygen in the reduced graphene oxide is higher than or equal to 2% and lower than or equal to 11%.

23. The method for forming the positive electrode of the battery according to claim 18, wherein the first medium and the second medium are a same material.

24. The method for forming the positive electrode of the battery according to claim 18, wherein the second mixture comprises the first medium in the step of adding the binder and the second medium.

* * * * *